(12) United States Patent
Niu et al.

(10) Patent No.: US 11,051,176 B2
(45) Date of Patent: Jun. 29, 2021

(54) FRAMEWORK FOR COMMUNICATIONS IN UNLICENSED NARROW BAND INTERNET OF THINGS (NB-IOT) SYSTEM

(71) Applicant: Apple Inc., Cupertino, CA (US)

(72) Inventors: Huaning Niu, Milpitas, CA (US); Wenting Chang, Beijing (CN); Qiaoyang Ye, Fremont, CA (US); Anthony Lee, San Diego, CA (US); Salvatore Talarico, Sunnyvale, CA (US)

(73) Assignee: Apple Inc., Cupertinoc, CA (US)

( * ) Notice: Subject to any disclaimer, the term of this patent is extended or adjusted under 35 U.S.C. 154(b) by 127 days.

(21) Appl. No.: 16/157,442

(22) Filed: Oct. 11, 2018

(65) Prior Publication Data

US 2019/0045372 A1 Feb. 7, 2019

Related U.S. Application Data

(60) Provisional application No. 62/571,669, filed on Oct. 12, 2017, provisional application No. 62/594,437, (Continued)

(51) Int. Cl.
*H04W 4/70* (2018.01)
*H04W 16/14* (2009.01)
*H04W 56/00* (2009.01)
*H04W 72/04* (2009.01)
*H04W 74/02* (2009.01)
(Continued)

(52) U.S. Cl.
CPC .............. *H04W 16/14* (2013.01); *H04L 5/005* (2013.01); *H04L 5/0007* (2013.01); *H04L 5/0044* (2013.01); *H04W 4/70* (2018.02); *H04W 56/0015* (2013.01); *H04W 72/044* (2013.01); *H04W 74/02* (2013.01);
(Continued)

(58) Field of Classification Search
CPC . H04B 1/7143; H04J 11/0073; H04J 11/0076; H04L 5/0007; H04L 5/0044; H04L 5/0048; H04L 5/005; H04W 4/0223; H04W 4/70; H04W 16/14; H04W 56/0015; H04W 72/044; H04W 74/02
See application file for complete search history.

(56) References Cited

U.S. PATENT DOCUMENTS 10,237,862 B2 * 3/2019 Shin ...................... H04L 5/0091
10,349,404 B2 * 7/2019 Chendamarai Kannan ................. H04W 48/16

(Continued)

*Primary Examiner* — Alpus Hsu
(74) *Attorney, Agent, or Firm* — Kowert Hood Munyon Rankin and Goetzel PC

(57) ABSTRACT

The present disclosure provides apparatuses, systems, methods, and machine readable storage medium for communications in a Narrow Band Internet of Things (NB-IoT) system in a sub-1 GHz band. In an embodiment, an apparatus for a user equipment (UE) includes a memory interface and a processor. The memory interface is operable to receive a configuration of a frame from a memory, the frame is to be used for communications in a Narrow Band Internet of Things (NB-IoT) system in a sub-1 GHz band, wherein the frame includes one or more anchor channels and one or more data channels. The processor is operable to encode uplink (UL) communication data for a base station or decode downlink (DL) communication data from the base station based on the configuration of the frame.

20 Claims, 21 Drawing Sheets

900

Initiating an initial access procedure or a resynchronization procedure on an anchor channel of a frame to synchronize or resynchronize with an eNB — 910

Decoding DL transmission received from the eNB on the anchor channel — 920

Related U.S. Application Data filed on Dec. 4, 2017, provisional application No. 62/623,259, filed on Jan. 29, 2018, provisional application No. 62/625,064, filed on Feb. 1, 2018, provisional application No. 62/658,254, filed on Apr. 16, 2018.

(51) Int. Cl.
*H04L 5/00* (2006.01)
*H04B 1/7143* (2011.01)
*H04W 4/02* (2018.01)
*H04J 11/00* (2006.01)

(52) U.S. Cl.
CPC ......... *H04B 1/7143* (2013.01); *H04J 11/0073* (2013.01); *H04J 11/0076* (2013.01); *H04W 4/023* (2013.01)

(56) References Cited

U.S. PATENT DOCUMENTS

| | | | |
|---|---|---|---|
| 10,397,889 B2* | 8/2019 | Shin | H04W 72/042 |
| 10,439,672 B2* | 10/2019 | Wang | H04B 1/713 |
| 10,455,550 B2* | 10/2019 | Nogami | H04W 72/0406 |
| 10,630,524 B2* | 4/2020 | Abedini | H04L 5/003 |
| 2018/0020360 A1* | 1/2018 | Yerramalli | H04W 72/0453 |
| 2018/0249511 A1* | 8/2018 | Rathonyi | H04W 74/006 |
| 2018/0309479 A1* | 10/2018 | Yerramalli | H04L 5/0012 |
| 2019/0028243 A1* | 1/2019 | Kim | H04L 27/2613 |
| 2019/0239051 A1* | 8/2019 | Hwang | H04W 56/001 |
| 2019/0239059 A1* | 8/2019 | Koorapaty | H04W 56/001 |

* cited by examiner

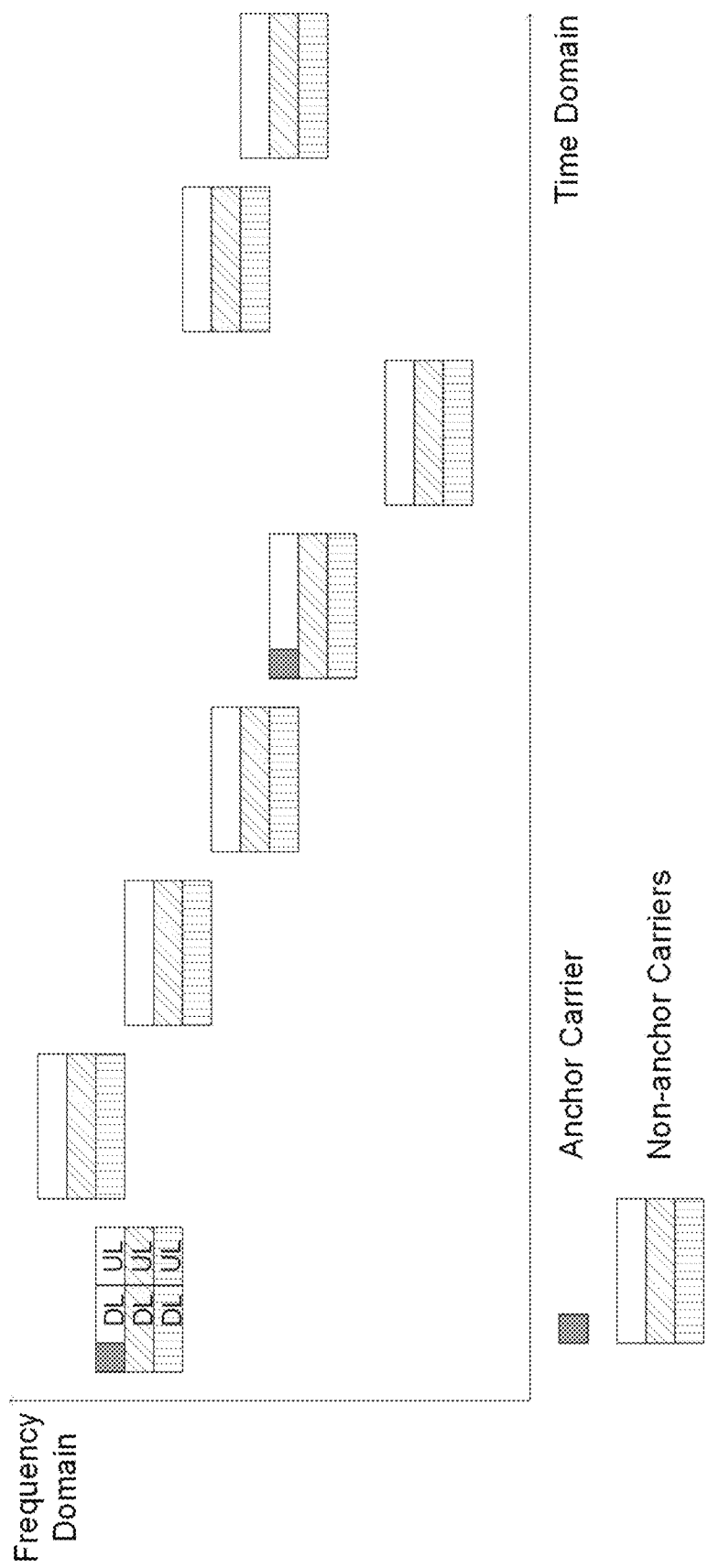

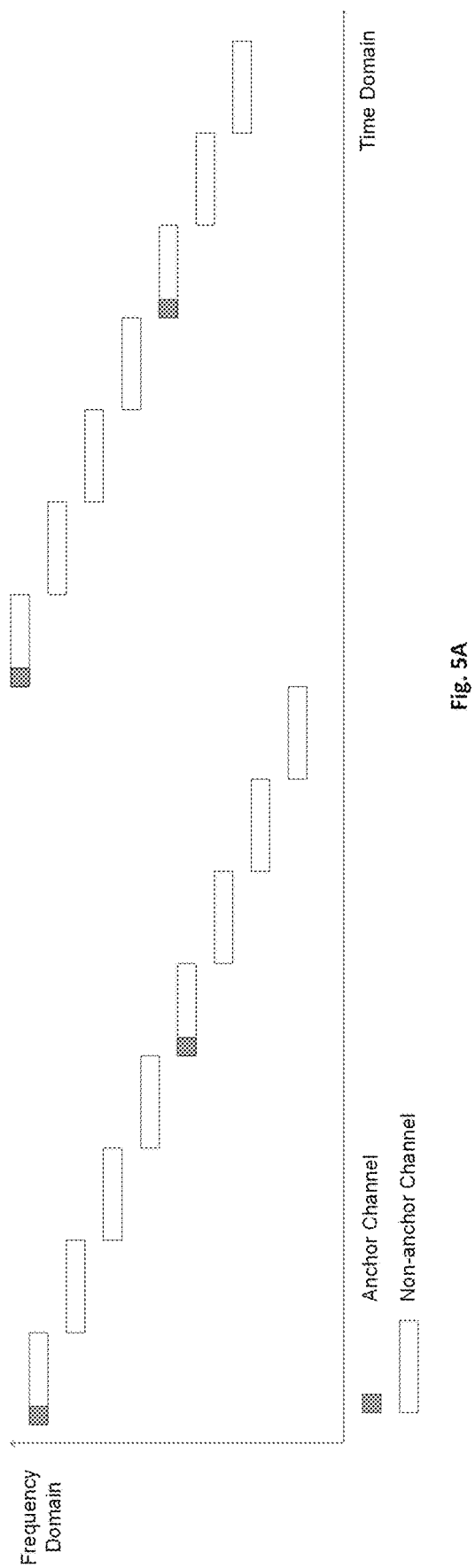

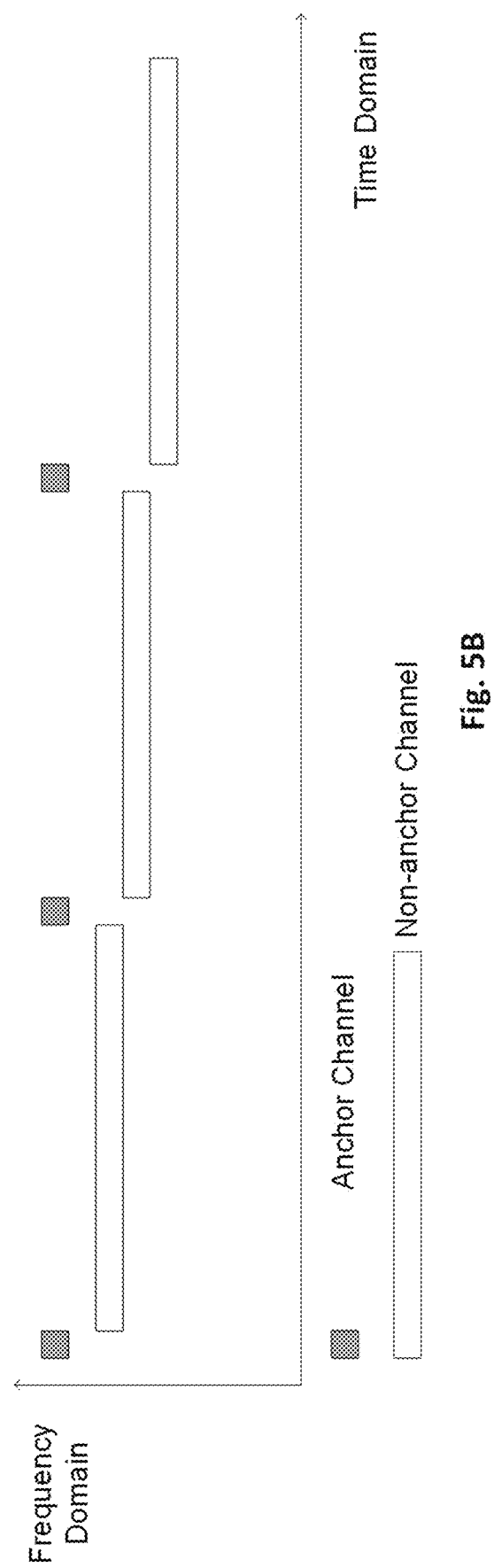

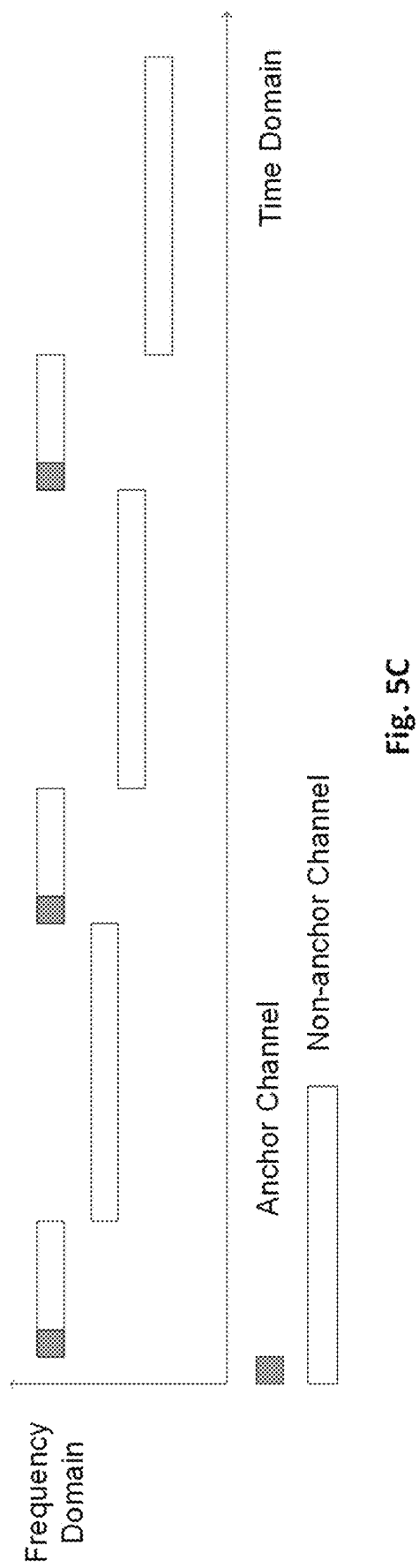

FRAMEWORK FOR COMMUNICATIONS IN UNLICENSED NARROW BAND INTERNET OF THINGS (NB-IOT) SYSTEM

CROSS REFERENCES TO RELATED APPLICATIONS

This application claims the benefit of priority to U.S. Provisional Patent Application Ser. No. 62/571,669, filed on Oct. 12, 2017, U.S. Provisional Patent Application Ser. No. 62/594,437, filed on Dec. 4, 2017, U.S. Provisional Patent Application Ser. No. 62/623,259, filed on Jan. 29, 2018, U.S. Provisional Patent Application Ser. No. 62/625,064, filed on Feb. 1, 2018, and U.S. Provisional Patent Application Ser. No. 62/558,259, filed on Apr. 16, 2018, all of which are hereby incorporated by reference in their entirety.

TECHNICAL FIELD

Embodiments of the present disclosure generally relate to the field of wireless communications, and more particularly, to communications using a frame including anchor channels and data channels in an unlicensed Narrow Band Internet of Things (NB-IoT) system.

BACKGROUND

The wireless communication industry has been developing a new technology called "MulteFire". "MulteFire" is such a standalone network operating in the unlicensed spectrum, which requires no assistance from the licensed spectrum and combines the performance benefits of LTE technology with the simplicity of Wi-Fi-like deployments.

In MulteFire 1.1, the unlicensed band IoT is one of the most important topics, which expands the market from a typical Mobile Broadband (MBB) service to the IoT in an unlicensed band. Current unlicensed band technologies, such as the third Generation Partnership Project (3GPP) 802.11ah standard and LoRa, are all in an early stage of deployment, without a significant market share. The diverse regulation requirements in the unlicensed band, particularly the sub-1 GHz band, put a hurdle to world-wide deployments of the long-range unlicensed band IoT technology.

BRIEF DESCRIPTION OF THE DRAWINGS

Embodiments will be readily understood by the following detailed description in conjunction with the accompanying drawings. In figures of the accompanying drawings, like reference numerals refer to similar elements.

FIG. 3A illustrates an example of synchronized hopping of an anchor carrier and a non-anchor carrier, in accordance with various embodiments of the disclosure.

FIGS. 5A-5C illustrate different examples of transmission on anchor channels in accordance of various embodiments of the disclosure

DETAILED DESCRIPTION

Figure 1:
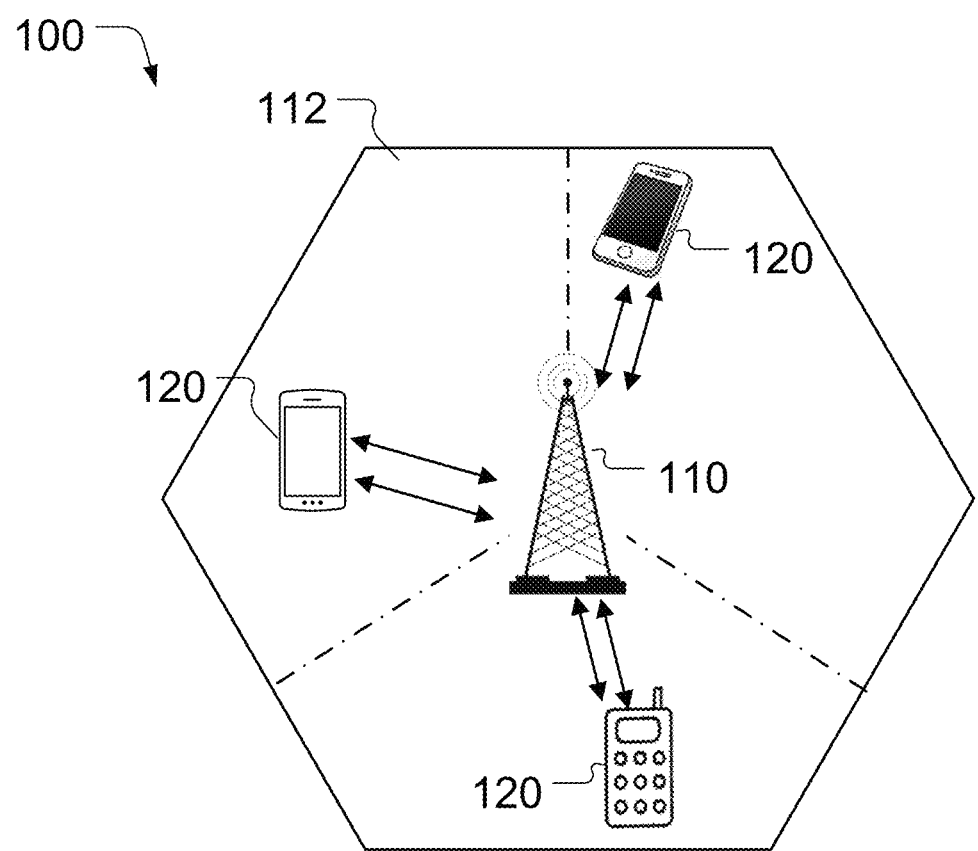
FIG. 1 illustrates a simplified wireless communication system in which embodiments of the disclosure can be implemented.

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

A target band for the unlicensed NB-IoT is the sub-1 GHz band in countries, such as, the United States (US), the European Union (EU), and China (CN). Regulations of these countries may define an unlicensed NB-IoT system as a digital modulation system or a frequency hopping system. To operate as the digital modulation system, a bandwidth (BW) of the system should be larger than 500 kilohertz (KHz), and a power spectral density (PSD) is 8 dBm/3 KHz. To operate as the frequency hopping system, limitations on a duty cycle and a number of hops are regulated. Different numbers of hops result in different max transmission powers. For example, in the EU, for the sub-1 GHz band, four new sub-channels have been proposed to be used and the proposal has been drafted in the European Committee (EC). These sub-channels may be 865.6 megahertz (MHz)~865.8 MHz, 866.2 MHz~866.4 MHz, 866.8 MHz~867.0 MHz, 867.4 MHz~867.6 MHz. In the EU, it is regulated that for these sub-channels, the maximum equivalent isotropically radiated power (EIRP) is 27 dBm; adaptive power control is required; bandwidth should be smaller than 200 KHz; and a duty cycle for network access points should be smaller than 10%. Otherwise, the duty cycle for other types of devices is 2.5%. In another example, in the US, two different types of regulations are defined, one of which is for frequency hopping spread spectrum (FHSS) and the other one is for digital modulation. Table 1 shows details of the two types of regulations.

TABLE 1

Details of regulations for FHSS and digital modulation in the US

| Modulation Type | Hopping Channel Carrier Frequency Separation | Channel BW | PSD Limit | Max Conducted Power (dBm) | EIRP (dBm) | Number of Channels | Dwell Time (each channel) |
|---|---|---|---|---|---|---|---|
| FHSS | Max{25 kHz, 20 dB BW} | 20 dB BW <250 kHz | No | 30 | 36 | ≥50 | ≤0.4 s/20 s |
|  |  | 20 dB BW ∈[250, 500] kHz | No | 24 | 30 | [25, 50] | ≤0.4 s/10 s |
|  |  |  | No | 30 | 36 | ≥50 |  |
| Digital Modulation | N/A | 6 dB BW ≥500 kHz | 8 dBm/3 kHz | 30 | 36 |  |  |

As can be seen, different countries may have different regulations for the unlicensed NB-IoT system in the sub-1 GHz band. The present application provides an unified frame structure for the unlicensed NB-IoT system in the sub-1 GHz band, which may be applied in countries such as, the US, EU and CN.

FIG. 1 illustrates a simplified wireless communication system 100 in which embodiments of the disclosure can be implemented. In some embodiments, the wireless communication system 100 may be a NB-IoT system.

In an embodiment, the wireless communication system 100 may include at least a base station 110 and one or more user equipment (UEs) 120. The base station 110 may be an evolved node B (eNB), or a next-generation node B (gNB). The base station 110 may be operable over a coverage area 112, which may be regarded as a cell. The UEs 120 may communicate with the base station 110 within the coverage area 112. In other embodiments, the wireless communication system 100 may include two or more base stations.

The UEs 120 may provide uplink (UL) transmission to and receive downlink (DL) transmission from the base station 110 in different frequency bands, for example, in the sub-1 GHz band. The base station 110 may also provide DL transmission to and receive UL transmission from the UEs 120. In an embodiments, the base station 110 may broadcast downlink (DL) transmission to the UEs 120. For example, the UEs 120 and the base station 110 may communicate based on a particular configuration of a frame, which will be described in details below.

Different countries may have different regulations on communications in different frequency bands, particularly, the sub-1 GHz band as mentioned above.

For example, each of the base station 110 and the UEs 120 may store a configuration of a frame to be used for communications in the NB-IoT system in the sub-1 GHz band, in its memory or storage. In an embodiment, the frame may include one or more anchor channels and one or more data channels.

In an embodiment, one or more anchor channels are hard-coded physical channels defined per frequency band based on the regulation of a specific country. For example, an anchor channel may be a fixed channel, which does not hop. In another embodiment, each of the anchor channels and data channels can be pre-defined as either hopped or not. As an example, in the EU, each of the channels is regulated as fixed. As another example, in the US, each of the channels is hopped. In another embodiment, each of the anchor channels and data channels can be configured by the base station 110 through higher layer signaling, to be hopped or fixed. For example, in case that a channel (e.g., an anchor channel or a data channel) is hopped, a hopping pattern of the channel may be determined based on one or more of: a cell identity (ID), a frame/subframe index, a high layer configured index, and a UE index. In another example, a hopping pattern may be pre-defined for each of the channels.

In an embodiment, each of the UEs 120, when in an idle mode, may initiate an initial access or re-synchronization procedure on an anchor channel to synchronize or resynchronize with the base station 110.

In an embodiment, the anchor channel may be used for DL transmission and/or UL transmission between the base station 110 and the UEs 120. For example, the DL transmission may include a Primary Synchronization Signal (PSS), a Secondary Synchronization Signal (SSS), a Physical Broadcast Channel (PBCH), a reduced System Information Block (SIB), remaining SIB1 and SIB2, other SIBs for broadcasting, and/or Messages 2, 4 and 5 for a random access (RA) procedure. Depending on the base station 110's scheduler, the DL transmission may also include other transmission, such as paging and unicasting Physical Downlink Shared Channel (PDSCH). For example, in the EU, there is a 10% maximum utilization (MU) constraint on the scheduler of the base station. For example, the UL transmission may include Messages 1 and 3 for the RA procedure.

After a Radio Resource Access (RRC) connection between one UE 120 and the base station 110 is established during the RA procedure, the base station 110 configures data channel information for unicast PDSCH for the UE. In an embodiment, for multi-carrier operation, or when an anchor channel has three Physical Resource Blocks (PRBs), one of the PRBs may be dedicated for PDSCH. In another embodiment, when an anchor channel has only one PRB, the transmission of PDSCH is on a data channel.

In an embodiment, the base station 110 may configure a hopping pattern for a channel other than an anchor channel (e.g., a data channel), through a RRC configuration, in a UE specific manner or cell specific manner. In that case, the UE 120 may monitor Physical Downlink Control Channel (PDCCH) only on channels conforming to the configured channel hopping pattern.

In an embodiment, based on the channel hopping pattern, a data channel may be defined as a specific frequency point where transmission/reception occurs at a specific time instance. In an embodiment, specific frequency points for transmission/reception are different at different time instances. In another embodiment, there may be one channel per transmission.

In an embodiment, a specific frequency point is a component frequency point for one channel at one time instance, and a component frequency point for another channel at another time instance.

In an embodiment, the base station 110 may transmit or receive on parallel channels. In another embodiment, the base station 110 is equipped with a dual-multiplexing capability, and is thus able to transmit on one channel and receive at another channel. As an example, for a NB-IoT system under the EU regulation, a frequency of each channel is 200 KHz, while the power of parallel channels is shared. As another example, for a NB-IoT system under the US regulation, the system may be evaluated based on digital modulation. In an embodiment, more than two parallel channels are configured, and an aggregated bandwidth is larger than 500 KHz.

In an embodiment, each of the UEs 120 can only transmit and receive on one channel in order to contain costs. For example, for a NB-IoT system under the US regulation, the system may be evaluated based on a Frequency Hopping Spread Spectrum (FHSS). In the system, for example, a minimum number of channels is 25, due to low power characteristics of the UEs 120.

In an embodiment, different channels may have the same or different UL/DL subframe configurations.

In another embodiment, random hopping patterns for different channels are carefully selected to avoid a frequency point collision between different channels at a specific time instance. For example, when the selected random hopping patterns fail to be guaranteed, a frequency point collision may occur between different channels at a specific time instance. In that case, if the frequency point collision occurs between an anchor channel and a data channel, the data channel is dropped; or if the frequency point collision occurs between two data channels, the base station 110 may make a decision based on its implementation for scheduling on the collided frequency point, wherein the decision is to schedule different UEs 120 on one channel or different channels.

Figure 2A:
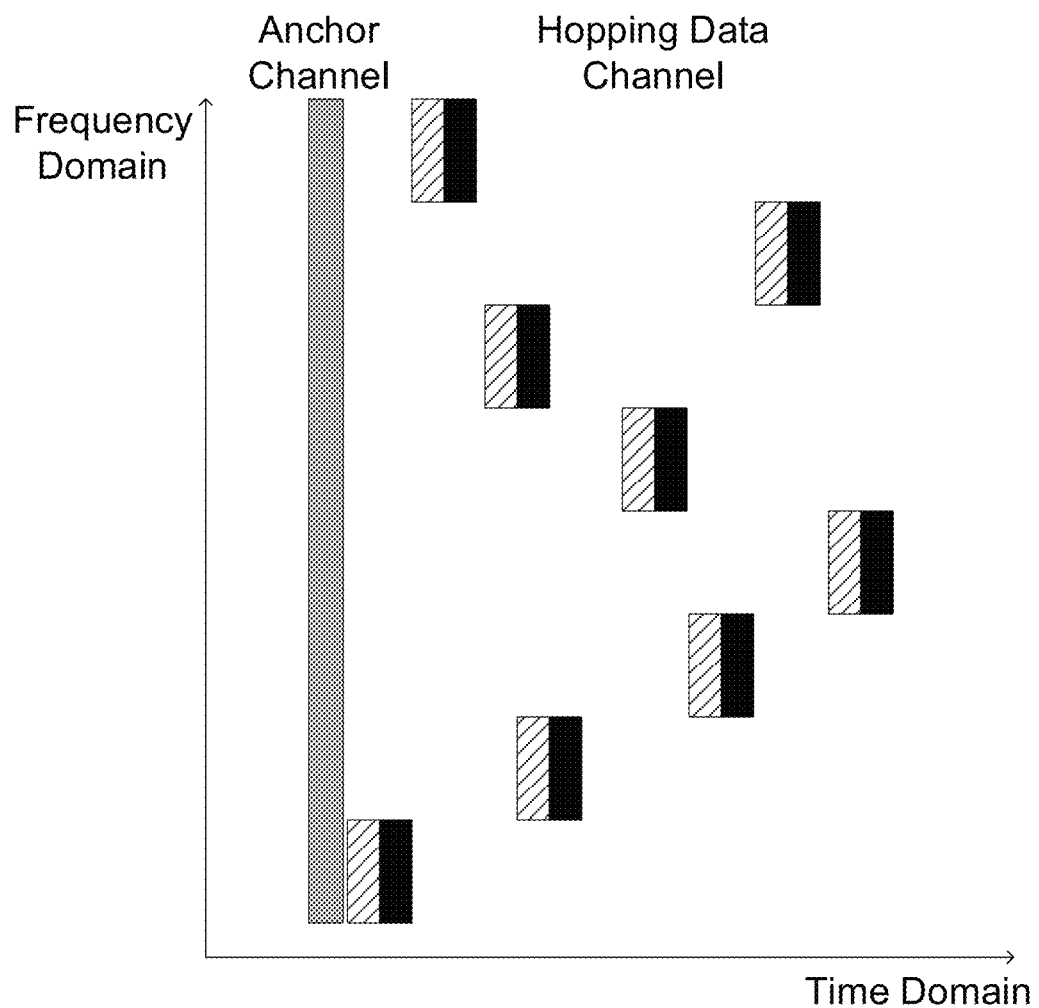
FIGS. 2A-2C illustrate different configurations of anchor channels and data channels, in accordance with various embodiments of the disclosure.
Figure 2B:
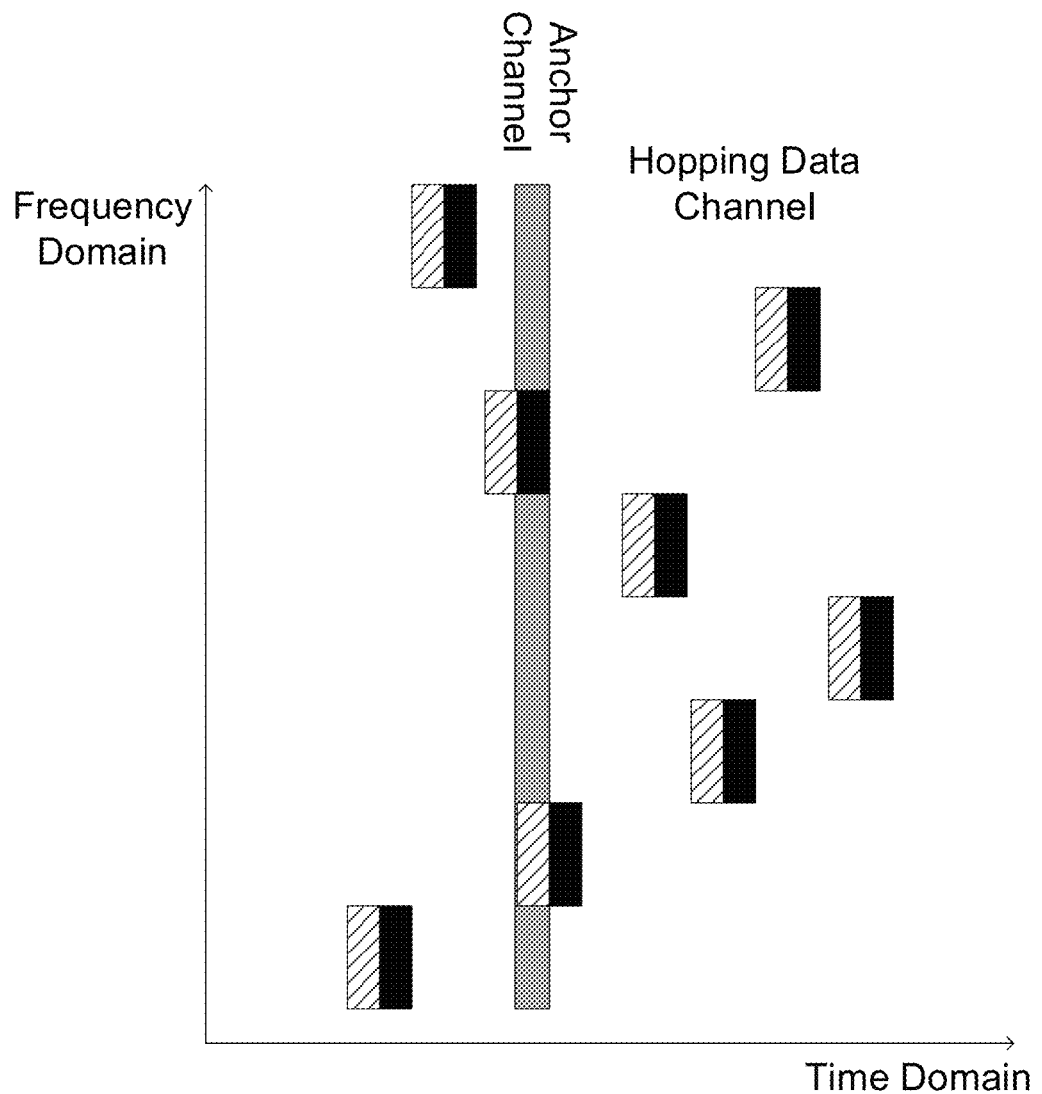
Figure 2C:
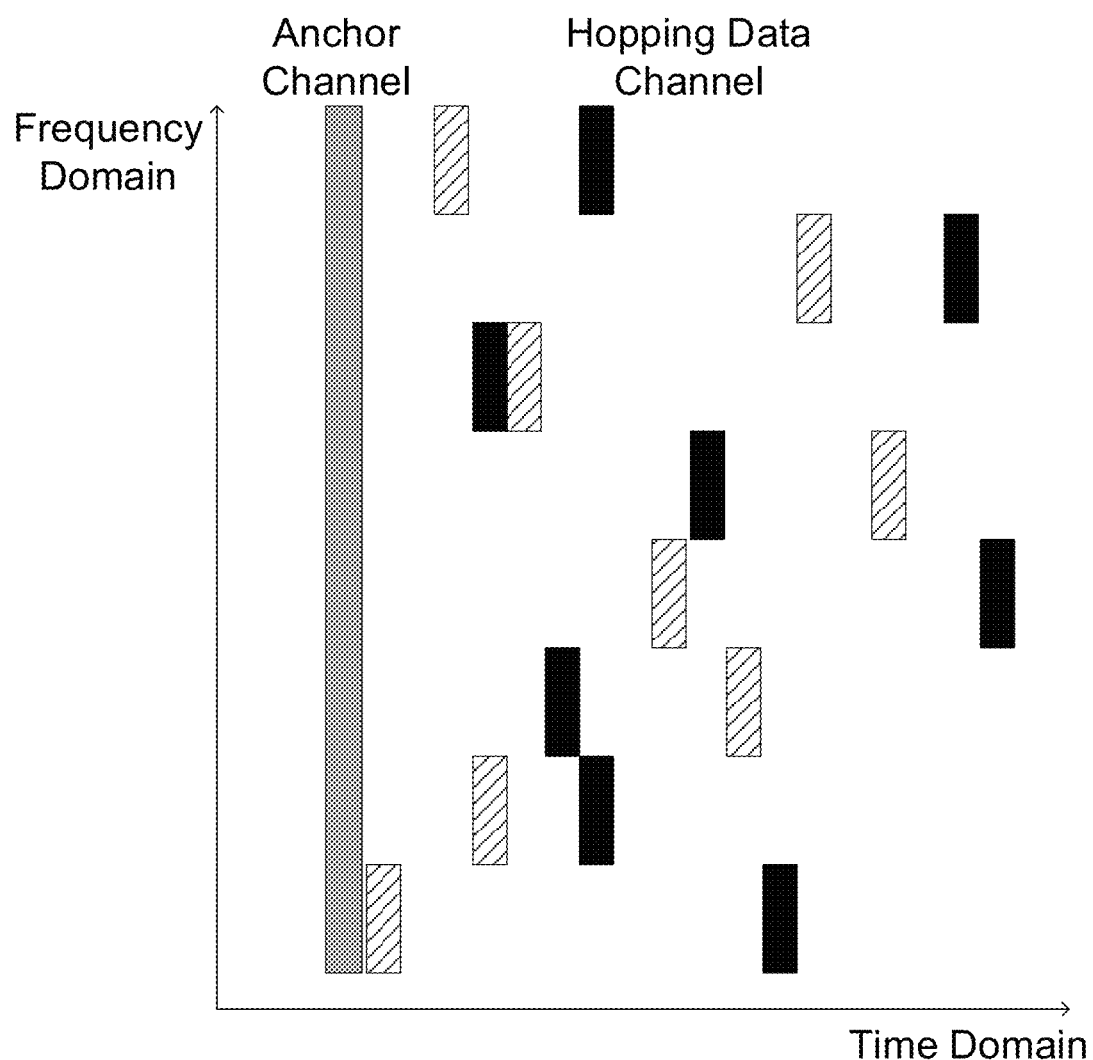

Taking a NB-IoT system under the US regulation as an example, FIGS. 2A-2C show different configurations of anchor channels and data channels, in accordance with various embodiments of the disclosure. As shown in the example of FIG. 2A, an anchor channel is not a part of a data channel, and no unicasting data will be transmitted on the anchor channel. As shown in the example of FIG. 2B, an anchor channel is a part is a data channel, and unicasting data is scheduled on the overlapped time. As shown in the example of FIG. 2C, an anchor channel is not a part of a data channel, and each data channel hops independently.

Under the US regulation, a base station (e.g., the base station 110 of FIG. 1) may be configured as a hybrid equipment. According to the US regulation, a system can operate as a digital modulation system or a frequency hopping system. As used herein, a "hybrid equipment" means that the equipment may operate for instance under a frequency hopping mode for UL transmission and operate under a digital modulation mode for DL transmission. In order to operate as the hybrid equipment, the base station requires to have at least two channels to meet a requirement of a frequency of 500 KHz when an equipment operates as a digital modulation equipment, for example, as shown in FIG. 2A and FIG. 2C. In an embodiment, the base station may configure a number of frequency hopping channels and a hopping pattern for each of the frequency hopping channels, in one of a reduced SIB, SIB1 and SIB2 on an anchor channel.

Under the US regulation, a UE (e.g., one of the UEs 120 of FIG. 1) may be configured as a frequency hopping device by including at least 25 frequency hopping channels, since as required by the regulation, a system operating as a frequency hopping system must hop over at least 25 channels if the channel bandwidth is between 250 KHz and 500 KHz. In the embodiment, the base station may configure the UE with a gap enabling the UE to switch from receiving from a data channel to an anchor channel, when the UE is in a connected mode to monitor paging or a SIB update.

As shown in FIG. 2B, the data channels may be overlapped with the anchor channels on non-Discovery Reference Signal (DRS) transmission time, for example. In the example, the base station requires to have at least 3 data channels to meet the regulatory requirements that a system operating in a digital modulation mode should have a bandwidth larger than 500 kHz, which means at least 3 PRBs or three data channels (where each data channel occupies one PRB).

In an embodiment, the NB-IoT system may be a multiple-carrier system, in that case, the anchor channels may be configured to be hopped. For example, an anchor carrier is hopped and a non-anchor carrier is also hopped. In an embodiment, all the carriers may have the same DL/UL configurations as configured by the base station through higher layer signaling.

Figure 3B:
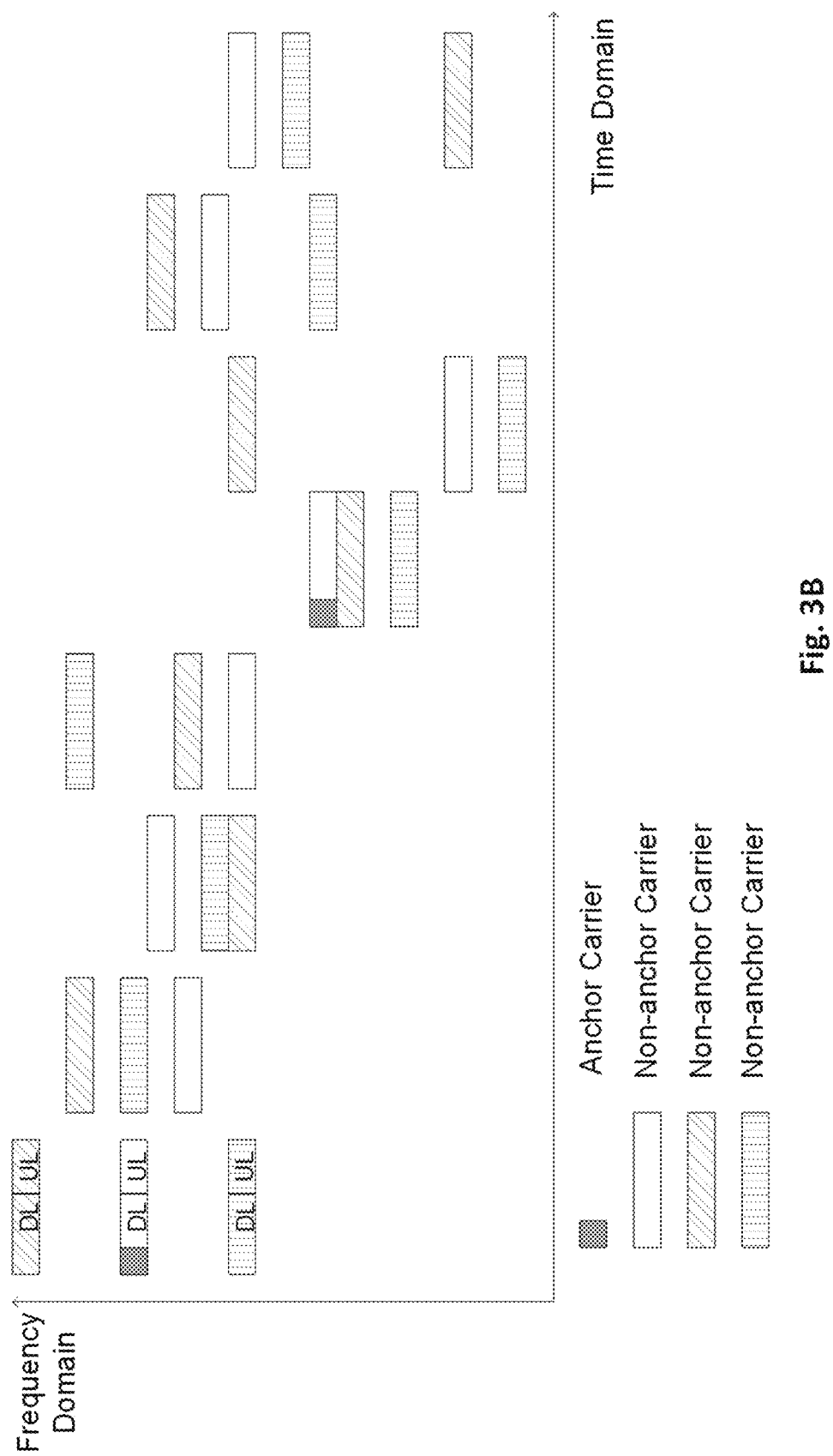
FIG. 3B illustrates an example of independent hopping of an anchor carrier and a non-anchor carrier, in accordance with various embodiments of the disclosure.

In an embodiment, a hopping pattern for the non-anchor carriers may be synchronized with a hopping pattern for the anchor carriers, as shown in FIG. 3A. For example, the non-anchor carriers may have a fixed frequency offset. In another embodiment, each carrier may maintain an independent pattern itself, as shown in FIG. 3B. In that case, the base station may configure a parameter for a non-anchor carrier by an anchor carrier, which may be utilized to indicate a frequency hopping pattern for the non-anchor carrier.

Figure 4A:
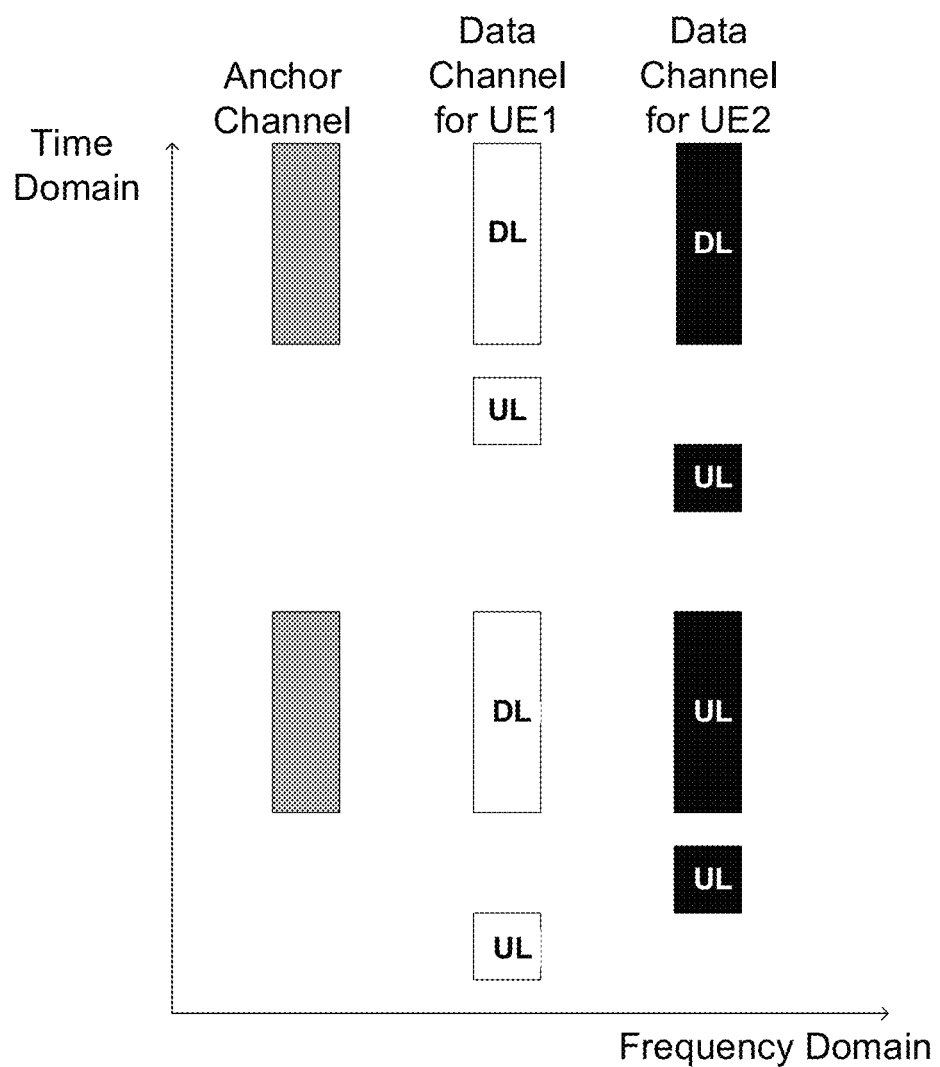
FIGS. 4A-4C illustrate different frame structures in accordance with various embodiments of the disclosure.
Figure 4B:
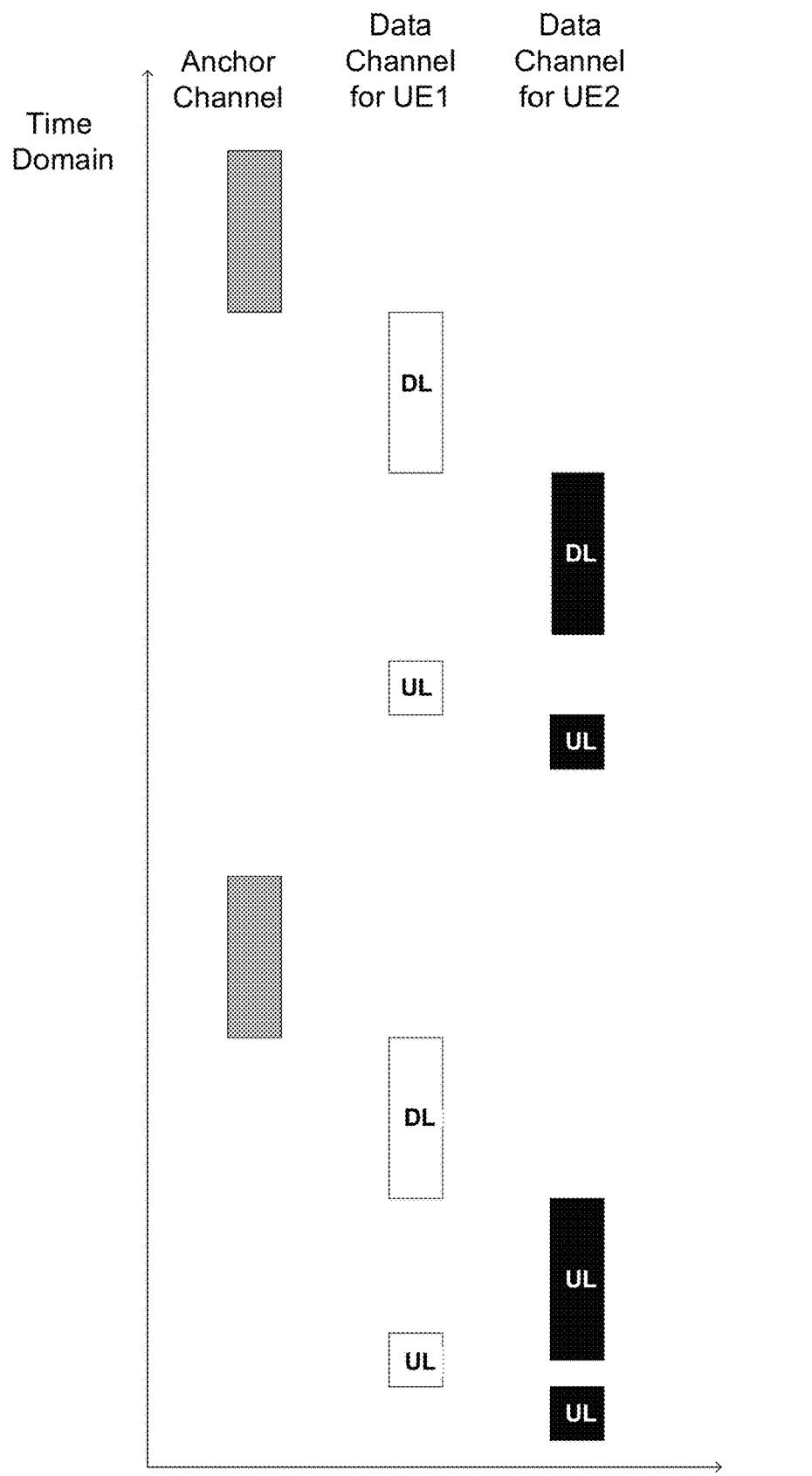
Figure 4C:
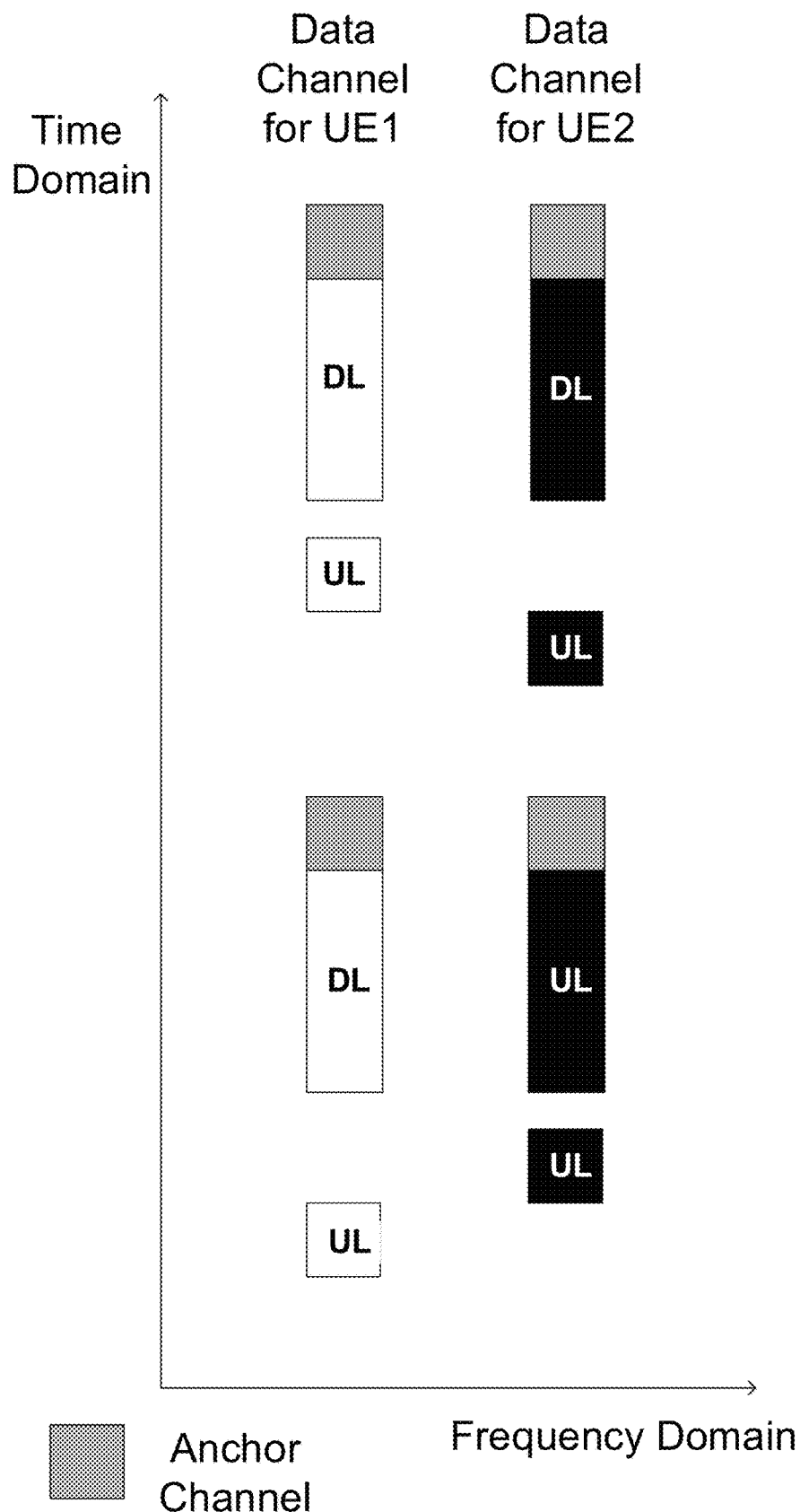

Taking a NB-IoT system under the EU and CN regulations as another example, FIGS. 4A-4C show different frame structures in accordance with various embodiments of the disclosure.

Under the EU and CN regulations, all channels are fixed, and thus no channel hopping is needed. In that case, a UE (e.g., one of the UEs 120 of FIG. 1) may be configured to use only one channel to monitor a narrow band Physical Downlink Control Channel (nPDCCH), a narrow band Physical Downlink Share Channel (nPDSCH), and transmit a narrow band Physical Uplink Share Channel (nPUSCH). As in FIGS. 4A-4C, only DRS and broadcast information (such as, the PBCH and/or SIBs) are transmitted on an anchor channel, and UL transmission may be scheduled to occur across different channels to fully utilize the channels.

Returning to FIG. 1, in an embodiment, the base station 110 and the UEs 120 may communicate in an anchor channel based mode. In the embodiment, the base station 110 may encode transmission of a DRS on one of the anchor channels. For example, the DRS may include one or more of: a PSS, an SSS, a PBCH, and/or an SIB.

In an embodiment, a number of the anchor channels may be predefined, for example, 2 or 4. The frame may include other numbers of anchor channels, which is not restricted herein.

In another embodiment, the number of the anchor channels may be determined by $\lfloor \alpha * N_{channel} \rfloor$ or $\lceil \alpha * N_{channel} \rceil$, wherein $N_{channel}$ is a total number of channels (e.g., 50), $\alpha$ is a ratio (e.g., 1/4), $\lfloor \cdot \rfloor$ means rounding down to an integer and $\lceil \cdot \rceil$ means rounding up to an integer.

In an embodiment, the anchor channels may be configured by the base station through higher layer signaling, to be used for other DL or UL transmission, besides the PSS, SSS or PBCH. For example, according to the base station's scheduling, the anchor channels may be used for broadcasting DL transmission (e.g., system information, paging information) or unicasting DL transmission.

In an embodiment, the dwell time of an anchor channel may be the same as or different from the dwell time of a non-anchor channel (e.g., a data channel).

In an embodiment, the dwell time of an anchor channel may be equivalent to a number of subframes required for transmission of the PSS/SSS/PBCH transmission. For example, the dwell time of the anchor channel may be 20 ms. In other examples, the dwell time of the anchor channel may also be 15 ms, 25 ms, or 30 ms, which is not limited herein. The dwell time of a data channel may be as small as possible. For example, it may be the same as the dwell time of an anchor channel.

In an embodiment, a frequency of an anchor channel may be fixed. For example, a frequency channel used as an anchor channel may be fixed or associated with a Physical Cell Identity (PCI). In that case, the UE need to blindly detect a position of an anchor channel during the initial access procedure.

In another embodiment, a frequency of an anchor channel may not be fixed on a specific channel, but occurs on different channels. Basically, the anchor channel may hop on the bandwidth available.

As used herein, "dwell time" is a time duration over which transmission occurs on a specific channel. In an embodiment, transmission of the PSS/SSS/PBCH may be restricted within the dwell time of an anchor channel, or may be spanned to multiple dwell times of multiple anchor channels. In an embodiment, the transmission of PSS, SSS, PBCH, or essential SIB may be on the same anchor channel or different anchor channels. For example, the transmission of PSS may span 10 subframes at an anchor channel 1, while the transmission of SSS/PBCH/essential SIB may span 10 subframes at an anchor channel 2. As used herein, the "essential SIB" is a reduced set of system information, and may include some of the system information normally contained in SIB1 or SIB2, which are considered essential for setting the system.

In an embodiment, there may be one or more data channels in a gap between two adjacent anchor channels, which may have the same frequency or different frequencies.

In an embodiment, a hopping pattern of a data channel and a hopping pattern of an anchor channel may be independent from each other. In the embodiment, the hopping pattern of the anchor channel may be either a regular pattern or a pseudo random pattern, and the hopping pattern of the data channel may be a pseudo random pattern. In the embodiment, an anchor channel may be inserted after every n data channel hops, where n indicates a DRS periodicity in unit of dwell of an anchor channel. For example, if the DRS periodicity is 80 ms, and given an anchor channel of 20 ms, an anchor channel may be inserted after every n=4 data channels.

FIGS. 5A-5C show different examples of transmission on anchor channels in accordance of various embodiments of the disclosure.

FIG. 5A-5C illustrate examples for a base station, which may operate in a wide band. As shown in FIG. 5A, there are two anchor channels out of eight channels and the two anchor channels are fixed. Further, the anchor channels occur in a periodic manner. Instead, the data channels hop. In an embodiment, a base station (e.g., the base station 110 of FIG. 1) may transmit the PSS/SSS/PBCH on each of the anchor channels, and a UE (e.g., one of the UEs of FIG. 1) may monitor one of the anchor channels for initial access.

As shown in FIG. 5B, the anchors may have shorter duration and occur more frequently. In an embodiment, a base station (e.g., the base station 110 of FIG. 1) may only transmit the PSS/SSS/PBCH, and/or essential SIB on each of the anchor channels.

FIG. 5C is an extension of FIG. 5B. As shown, besides the PSS/SSS/PBCH, and/or essential SIB, additional DL or UL transmission may be transmitted on each of the anchor channels. In an embodiment, each channel may include a Discovery Reference Signal (DRS). The DRS may have a long periodicity. In the embodiment, a base station may be scheduled to meet the 10% MU as regulated in the EU.

As used herein, a frequency channel is the unit of which a channel bandwidth is composed of. When a frequency channel is allocated to transmit the PSS/SSS/PBCH, it is called an anchor channel. In an embodiment, a frequency channel to be specified as an anchor channel is fixed, and may correspond to a logic channel index, which may be hopped based on a random sequence.

In an embodiment, one anchor channel is supported. For example, an initial access channel is defined as $N_{data} \times T_{dwell}$, where $T_{dwell}$ is a time duration of an anchor channel (e.g., 10 ms for PSS/SSS), and $N_{data}$ is a number of data dwells of time duration $T_{dwell}$, and a "data dwell" is a time duration of a data channel: an amount of time spent to transmit data over a specific frequency channel dedicated for data. In the embodiment, the SSS is not utilized to indicate a cell ID, but a channel index of the next hopping channel for transmission of the PBCH and essential SIB. Instead, the cell ID information is carried in a Master Information Block (MIB). As an example, the anchor channel is utilized to transmit the PSS/SSS/PBCH/essential SIB, and the $T_{dwell}$ is increased to 20 ms.

In another embodiment, multiple anchor channels are supported. A UE (e.g., one of the UEs 120 of FIG. 1) may detect the PSS at a fixed physical channel, which may be referred to as an anchor channel 1 and the anchor channel 1 may correspond to a logical channel 5, for example. After detecting the PSS, the UE may hop to another anchor channel 2 (corresponding to a logical channel 47, for example) for the SSS, PBCH and/or essential SIB. In the embodiment, the SSS/PSS/PBCH and/or essential SIB are not periodically transmitted, but transmitted based on a random hopping pattern. In the embodiment, for example, dwell time of an anchor channel and dwell time of a data channel may be the same. As an example, the dwell time of the anchor channel and dwell time of the data channel may equal to a time duration of minimum subframes required for transmission of the SSS/PSS/PBCH, e.g., 8 ms, 10 ms or 15 ms. As another example, the dwell time of the anchor channel and dwell time of the data channel may equal to a half of a time duration of minimum subframes required for transmission of the SSS, PSS, PBCH and essential SIB. For example, the PSS and a part of the SSS may be transmitted on a first anchor channel, and the other part of the SSS, the PBCH, and essential SIB may be transmitted on a second anchor channel.

In the scenario where the PSS/SSS/PBCH and essential SIB are spread across multiple anchor channels, acquisition time for these channels lasts the duration of each anchor channel plus duration of .gaps between the anchors. For example, if the PSS/SSS/PBCH and essential SIB are spread across two anchor channels, initial time for acquisition of the first anchor channel is $N_{data} \times T_{dwell}$, and time for an acquisition of the second anchor channel is $N_{gap} \times T_{dwell}$, where $T_{dwell}$ is a time duration of an anchor channel, and $N_{data}$ is a number of data dwells of time duration $T_{dwell}$, and $N_{gap}$ is a number of data dwells that separate the first anchor channel from the second anchor channel (in the example, a gap between two anchor channels is given in unit of $T_{dwell}$). Specifically, for example, if time duration of an anchor channel (i.e., $T_{dwell}$) is 20 ms, and the two anchor channels are separated by 40 ms, the total acquisition time is 20×2+ 40=80 ms.

In another embodiment, a base station (e.g., the base station 110 of FIG. 1) selects a frequency hopping pattern or a mapping between a physical anchor channel and a logical channel index, so as to guarantee that a gap between a first anchor channel and a second anchor channel is small enough.

In some embodiments, the NB-IoT system (e.g., the wireless communication system of FIG. 1) may support two or more anchor channels. In an embodiment, a UE (e.g., one of the UEs 120 of FIG. 1) may use one or more anchor channels for initial synchronization. For example, the one or more anchor channels may carry multiple repetitions of a narrow band Primary Synchronization Signal (nPSS) (e.g., 12), a narrow band Secondary Synchronization Signal (nSSS) (e.g., 4), a narrow band Physical Broadcast Channel (nPBCH) (e.g., 4), together with SIB information, while the other anchor channels may be used to resynchronize with the base station by a UE in an idle mode. When resynchronizing, since the UE has already have knowledge of a Physical Cell Identity (PCI) and would be probability subject to an attenuated timing ambiguity, the UE requires only fewer repetitions of nPSS and nSSS (e.g., 7/3 or 4/1) to resynchronize, and the rest of the subframes may be used for other DL or UL transmission. For that purpose, in an embodiment, as compared with an anchor channel for synchronization, an anchor channel for resynchronization may be shorter, and include fewer nPSS and nSSS signals.

In an embodiment, a periodicity of the anchor channel for resynchronization is different from a periodicity of the anchor channel for synchronization. In an embodiment, the shorter anchor channel may repeat more frequently. In another embodiment, the shorter anchor channel may also carry PBCH or some critical System Information (SI), in order to provide an indication of SI update.

Figure 6A:
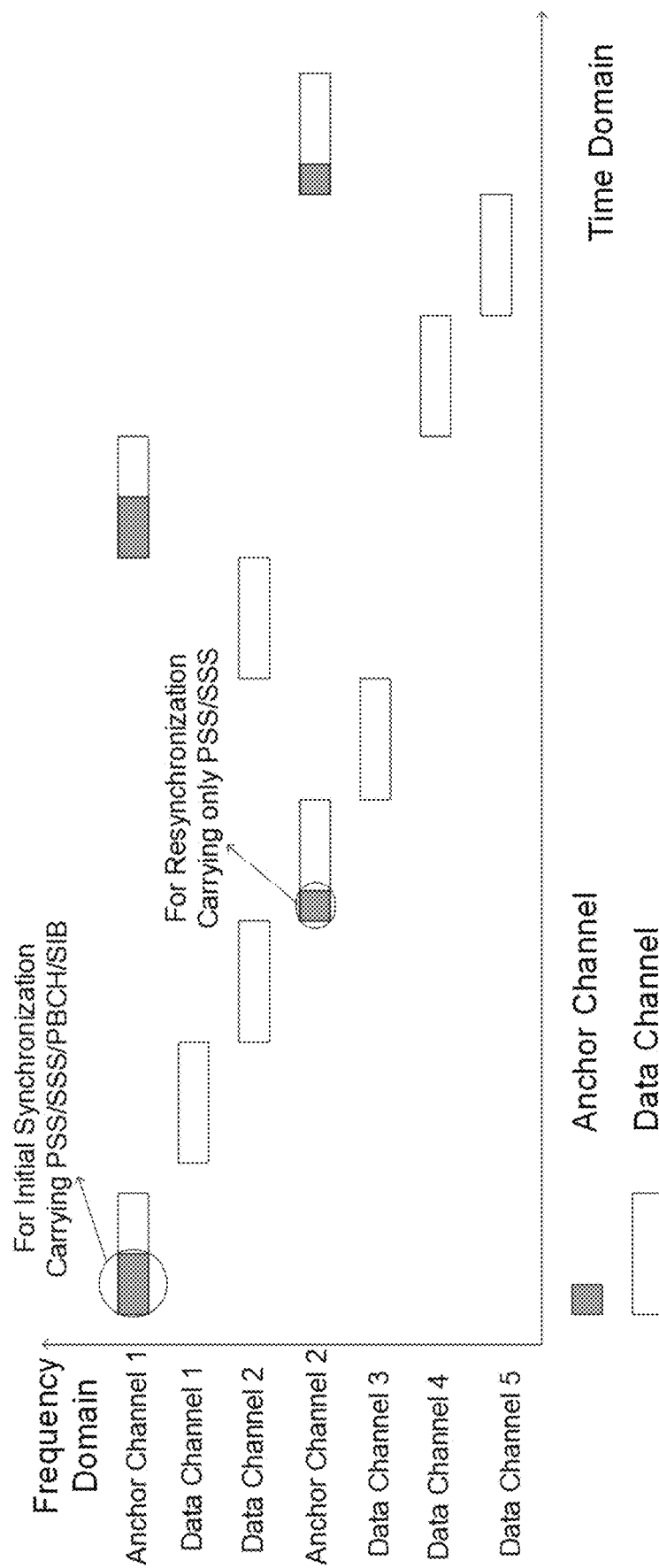
FIGS. 6A-6B illustrate examples of two types of anchor channels, one of which is for initial synchronization and the other one is for resynchronization, in accordance with various embodiments of the disclosure.
Figure 6B:
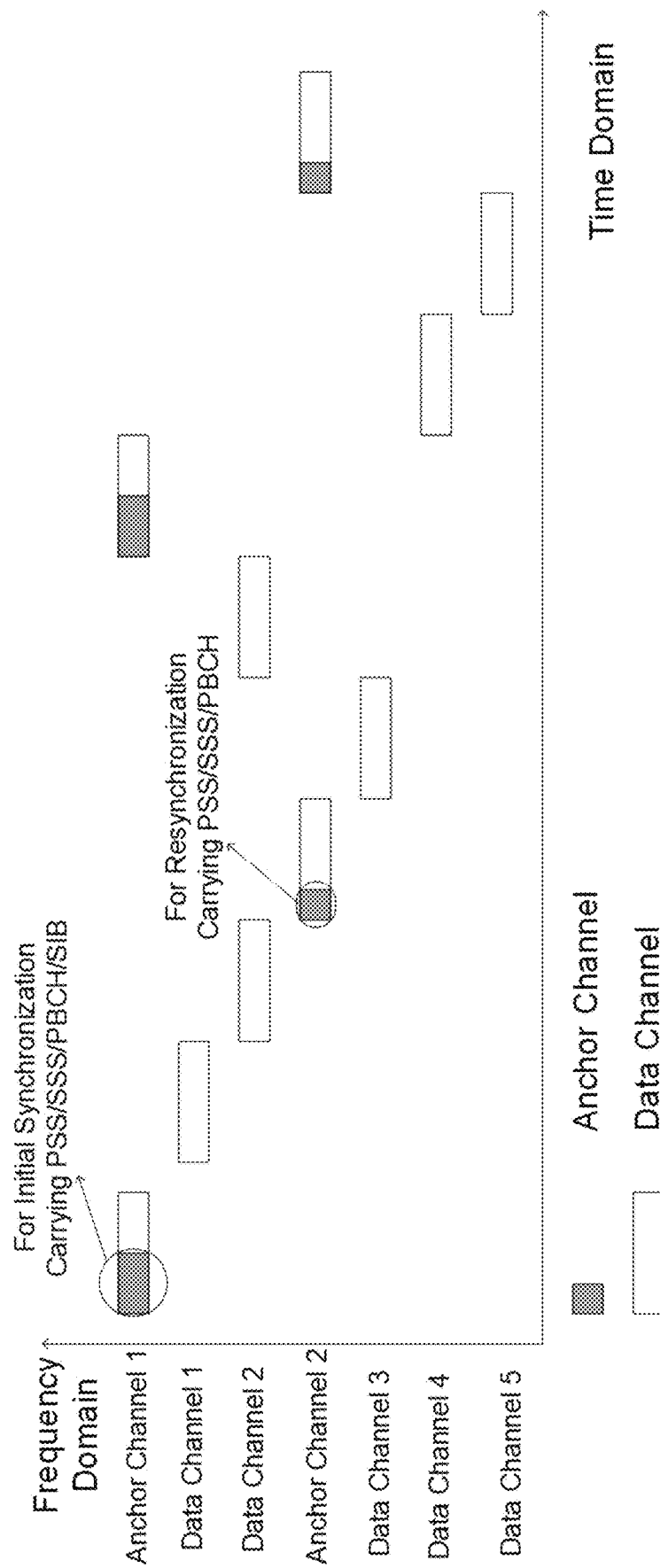

In another embodiment, a length of the anchor channel for resynchronization is the same as a length of the anchor channel for synchronization. In the embodiment, the anchor channel for synchronization may carry multiple repetitions of nPSS/nSSS (e.g., 12/4) and nPBCH (e.g., 4), together with SIB information. However, as compared with the anchor channel for synchronization, the anchor channel for resynchronization may carry a shorter Discovery Reference Signal (DRS) (which includes fewer repetitions of nPSS and nSSS (e.g., 7/3 or 4/1)) and may not carry the nPBCH, and the rest of the anchor channel for resynchronization may be used for other DL and/or UL transmission, as shown in the example of FIG. 6A. Alternatively, the anchor channel for resynchronization may also carry the nPBCH, as shown in the example of FIG. 6B. FIGS. 6A-6B show examples of two types of anchor channels, one of which is for initial synchronization and the other one is for resynchronization, in accordance with various embodiments of the disclosure.

In an embodiment, the anchor channel for synchronization and the anchor channel for resynchronization may have different periodicities of occurrence.

In an embodiment, cyclic shifts for the nSSS may be applied to all anchor channels or only anchor channels for resynchronization to carry essential barring information. In other words, the cyclic shifts within the nSSS may be used to indicate whether the baring information have changed or not. In an embodiment, a number of the cyclic shifts used is based on a number of barring information bits that are carried. As an example, if one barring bit is carried in the nSSS signal, two cyclic shifts are used.

Figure 7:
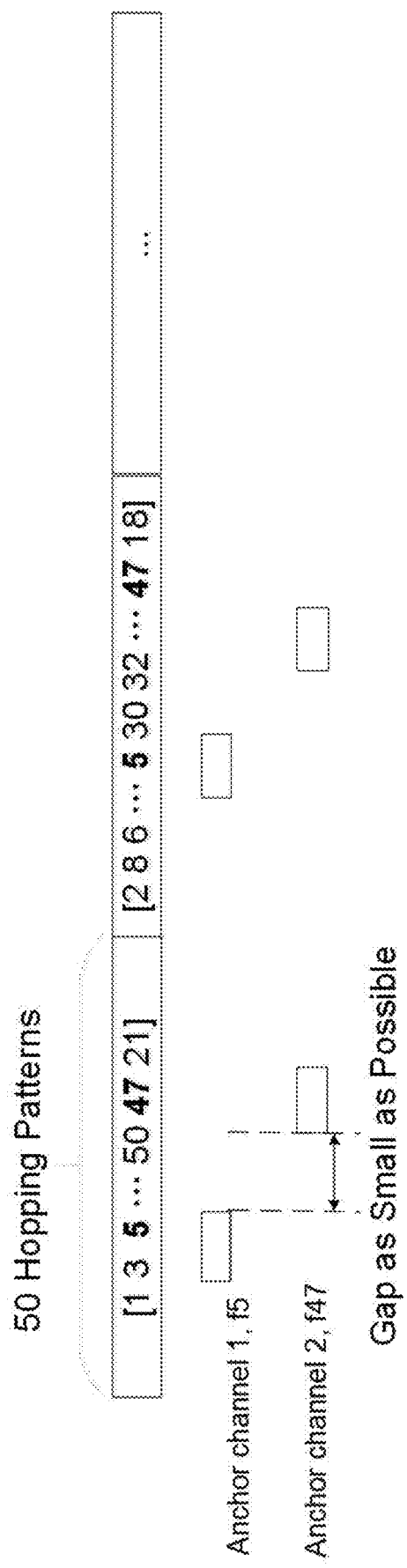
FIG. 7 illustrates an example of an anchor channel design with random logical channel sequence in accordance with various embodiments of the disclosure.

In an embodiment, a base station (e.g., the base station 110 of FIG. 1) may configure one or more anchor channels for resynchronization in a SIB 1. FIG. 7 shows an example of an anchor channel design with random logical channel sequence, in accordance with various embodiments of the disclosure.

In an embodiment, the anchor channels for resynchronization may occurs periodically in time, but over different frequency channels. In an embodiment, an exact position of an anchor channel for resynchronization may be determined based on a System Frame Number (SFN) and a PCI. For example, a frequency hopping sequence may be generated based on the SFN and PCI, and the exact position of an anchor channel for resynchronization may be known from the frequency hopping sequence.

In an embodiment, the anchor channels for resynchronization and anchor channels for synchronization may be transmitted evenly over time. For example, in a case that there are 64 channels, the anchor channel for synchronization may occur in the first channel/hop and the anchor channel for resynchronization may occur in the 33th channel/hop.

In an embodiment, the anchor channel for resynchronization occurs a number of hops after the anchor channel for synchronization. In the embodiment, the number of hops may either be fixed or be configured by a base station (e.g., the base station 110 of FIG. 1).

In an embodiment, when a frame includes multiple anchor channels, for example, a primary anchor channel used for synchronization and a secondary anchor channel for resynchronization, the primary anchor channel is always transmitted on a specific and known frequency channel, while the secondary anchor channel is transmitted after a given time offset (for example after a number of hops from the primary hopping channel) over a frequency channel, which may be determined according to the frequency hopping sequence. For example, the time offset or the number of hops may be fixed or configured by a base station (e.g., the base station 110 of FIG. 1).

Figure 8:
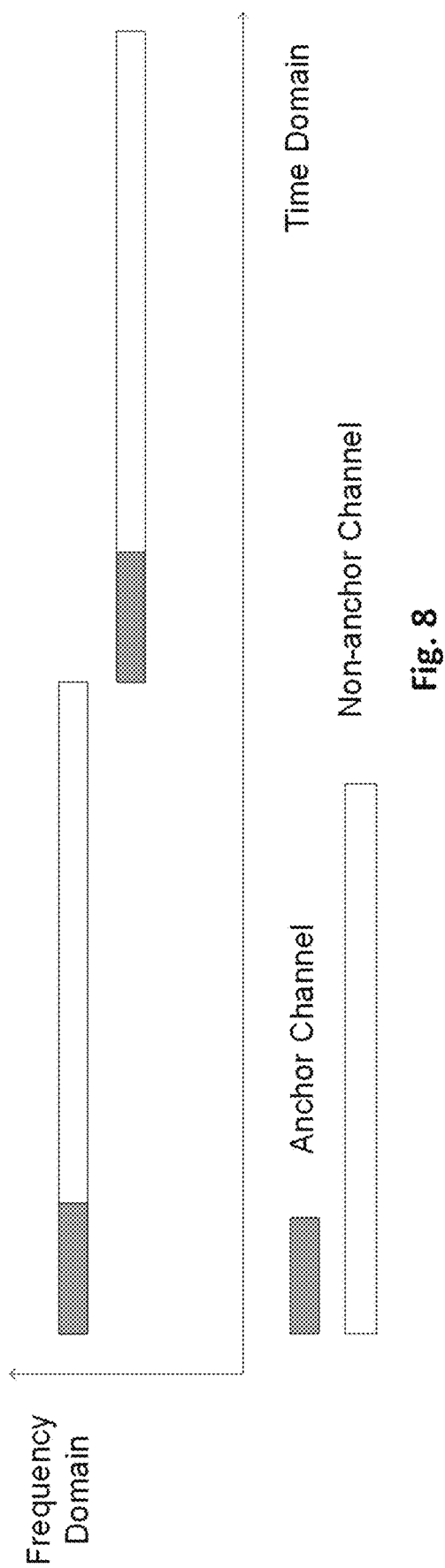
FIG. 8 illustrates another example of an anchor channel design with random logical channel sequence in accordance with various embodiments of the disclosure.

Returning to FIG. 1, in an embodiment, the base station 110 and the UEs 120 may communicate in a non-anchor channel based mode. In the embodiment, each of the anchor channels and data channels is able to be used for transmission of the PSS/SSS/PBCH and essential SIBs, and/or broadcasting/unicasting DL or UL subframes. FIG. 8 shows another example of an anchor channel design with random logical channel sequence, in accordance with various embodiments of the disclosure. As shown in FIG. 8, in an embodiment, each of the anchor channels and data channels may have the same dwell time. In the embodiment, a frequency hopping pattern for each of the anchor channels and data channels may be generated randomly. For example, the non-anchor channel based mode may be applied to NB-IoT systems under regulations of the EU and CN.

As known in the related arts, 3GPP Nb-IoT designs a 180 KHz RB based system. In the system, a bandwidth for the UE is always 180 KHz, while the base station can have multi-channel operation to meet the overall capacity requirement. For example, an anchor RB may be defined based on a long term evolution (LTE) raster. In the system, an initial access procedure or a resynchronization procedure may be performed on the anchor RB. The frame structure proposed in the disclosure maximizes the reuse of the current NB-IoT design, and meets the complex regulation requirements in the sub-1 GHz, in different countries.

Figure 9:
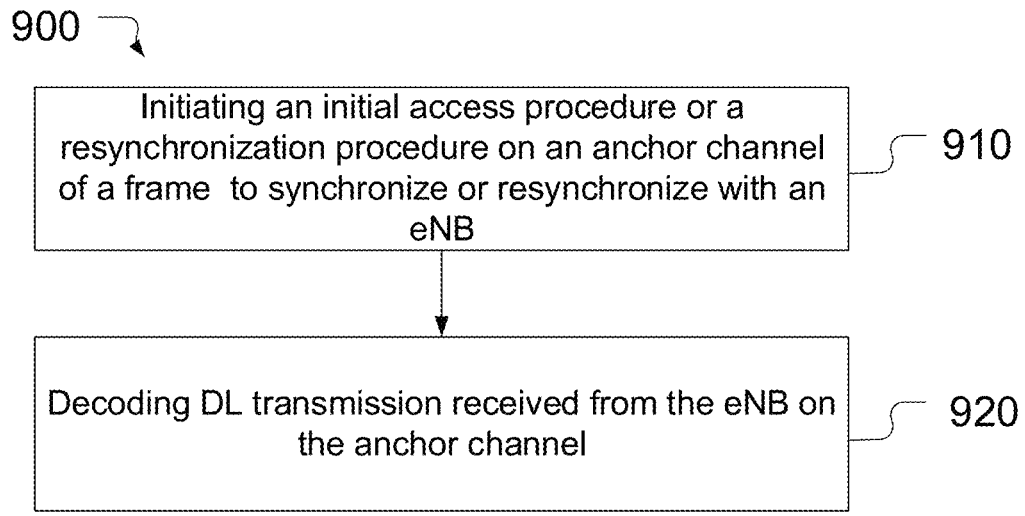
FIG. 9 illustrates is a flow chart of a method for communications between a UE and a base station in a NB-IoT system in a sub-1 GHz band in accordance with various embodiments of the disclosure.

Referring to FIG. 9, illustrated is a flow chart of a method 900 for communications between a UE and a base station in a NB-IoT system in a sub-1 GHz band, in accordance with various embodiments of the disclosure. In some aspects, the method 900 may be performed by one of the UEs 120 of FIG. 1. In other aspects, a machine readable storage medium may store instructions associated with method 900, which when executed can cause a UE to perform the method 900.

The method 900 may include, at 910, initiating an initial access procedure or a resynchronization procedure on an anchor channel of a frame for the communications, to synchronize or resynchronize with the base station (e.g., the base station 110 of FIG. 1), when the UE is in an idle mode. In an embodiment, the frame may include one or more anchor channels and one or more data channels. The anchor channels and data channels may be fixed or hopped based a configuration of the frame and/or regulations of different countries, such as, the regulations of the US, EP or CN.

The method 900 may further include, at 920, decoding DL transmission received from the base station on the anchor channel. For example, the DL transmission may include a PSS, an SSS and/or a PBCH.

Figure 10:
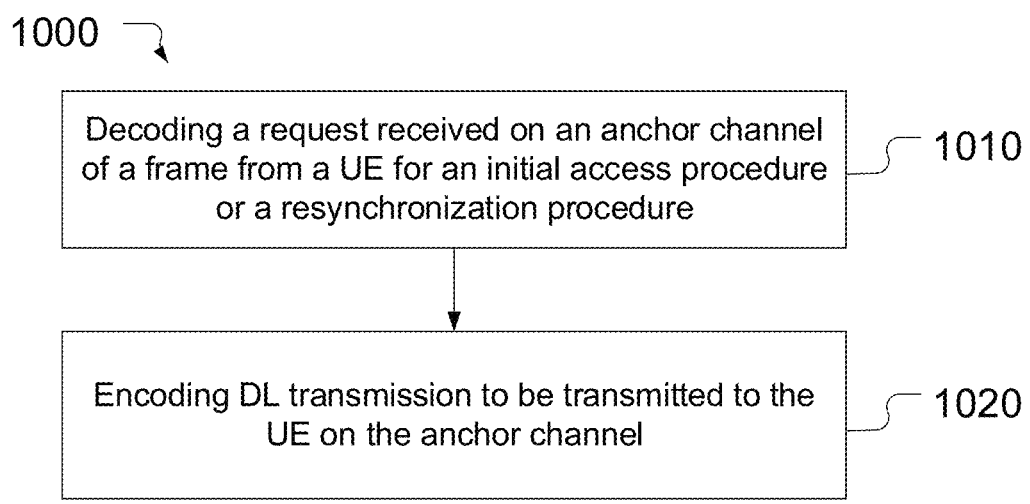
FIG. 10 illustrates is a flow chart of another method for communications between a base station and a UE in a NB-IoT system in a sub-1 GHz band in accordance with various embodiments of the disclosure.

Referring to FIG. 10, illustrated is a flow chart of a method 1000 for communications between a base station and a UE in a NB-IoT system in a sub-1 GHz band, in accordance with various embodiments of the disclosure. In some aspects, the method 1000 may be performed by the base station 110 of FIG. 1. In other aspects, a machine readable storage medium may store instructions associated with method 1000, which when executed can cause a base station to perform the method 1000.

The method 1000 may include, at 1010, decoding a request received on an anchor channel of a frame for the communications, from the UE (e.g., one of the UEs 120 of FIG. 1) for an initial access procedure or a resynchronization procedure. For example, when the UE is in an idle mode, it will send the request on the anchor channel to the base station, in order to initiate the initial access procedure or the resynchronization procedure for synchronization or resynchronization with the base station. In an embodiment, the frame for the communications may include one or more anchor channels and one or more data channels. The anchor channels and data channels may be fixed or hopped based a configuration of the frame and/or regulations of different countries, such as, the regulations of the US, EP or CN.

The method 1000 may further include, at 1020, encoding DL transmission to be transmitted to the UE on the anchor channel, after receiving the request for the initial access procedure or the resynchronization procedure. For example, the DL transmission may include a PSS, an SSS, and/or a PBCH.

Figure 11:
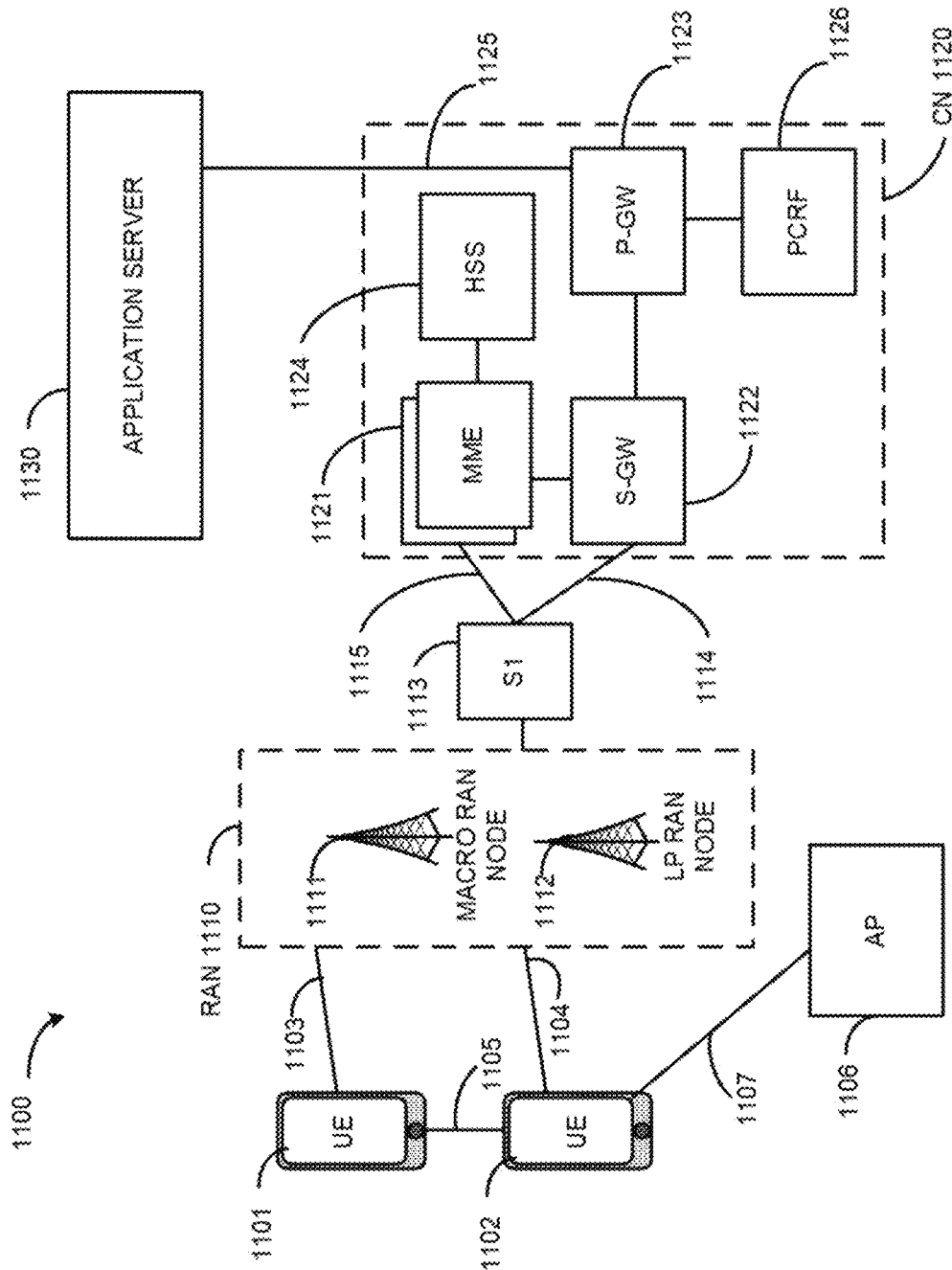
FIG. 11 illustrates an architecture of a system of a network in accordance with various embodiments of the disclosure.

FIG. 11 illustrates an architecture of a system 1100 of a network, in accordance with various embodiments of the disclosure. The system 1100 is shown to include a UE 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an IoT UE, which can comprise a network access layer designed for low-power IoT applications utilizing short-lived UE connections. For example, the UE 1101 and 1102 may operate as any of UEs 120 of FIG. 1. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further details below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further details below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced the control channel elements (eCCEs). Similar to above, each eCCE may correspond to nine sets of four physical resource elements known as an enhanced resource element groups (eREGs). An eCCE may have other numbers of eREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
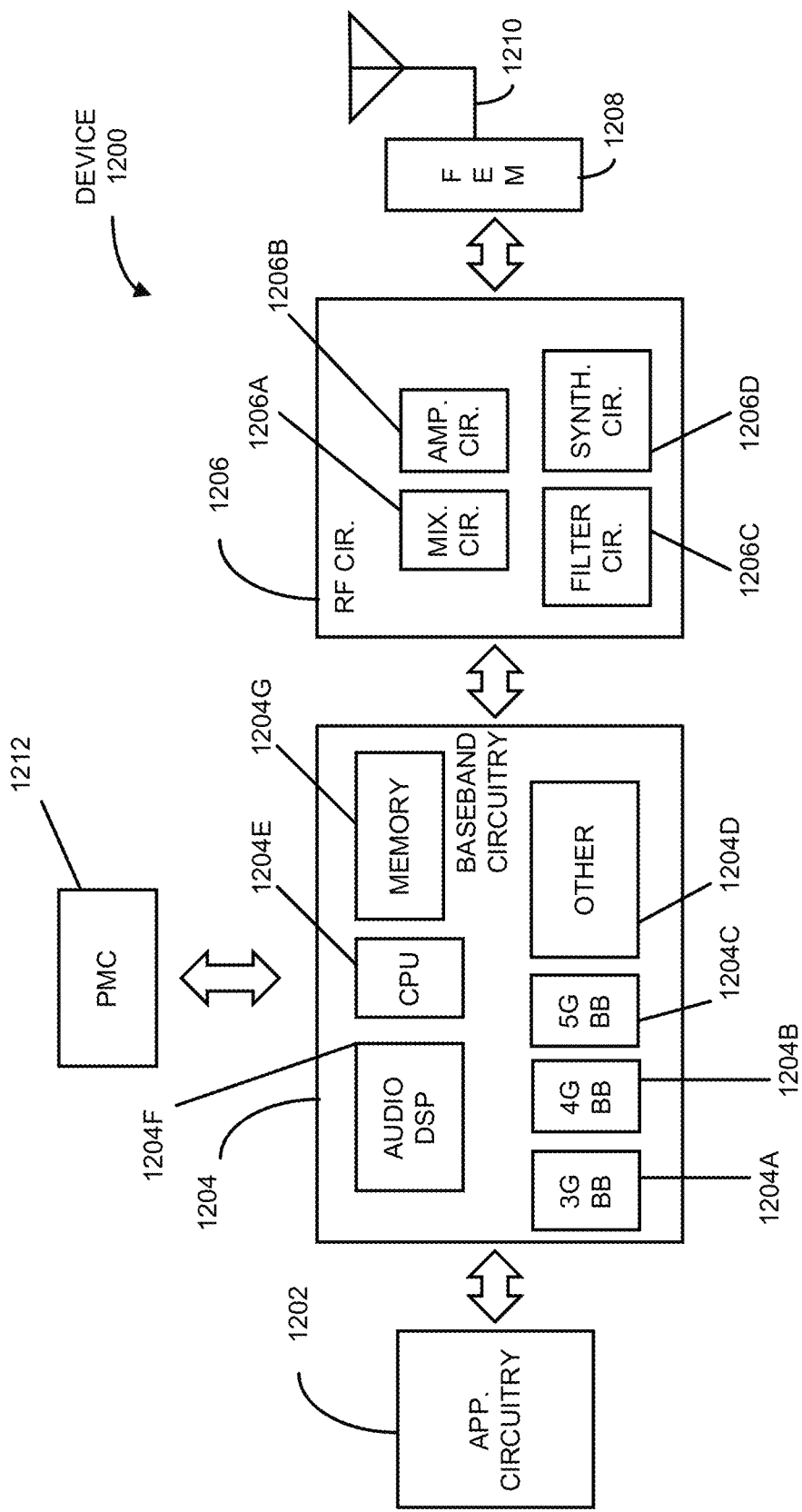
FIG. 12 illustrates example components of a device in accordance with various embodiments of the disclosure.

Embodiments described herein may be implemented into a system using any suitably configured hardware and/or software. FIG. 12 illustrates example components of a device 1200, in accordance with various embodiments of the disclosure. In embodiments, the device 1200 may be, implement, be incorporated into, or otherwise be a part of the base station 110 or UEs 120 of FIG. 1, or some other electronic devices. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In an embodiment, the memory 1204G may store configurations of frames, for examples, the frames designed as described above in FIGS. 2A-8.

In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP(s)) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206A, amplifier circuitry 1206B and filter circuitry 1206C. In some embodiments, the transmit signal path of the RF circuitry 1206 may include filter circuitry 1206C and mixer circuitry 1206A. RF circuitry 1206 may also include synthesizer circuitry 1206D for synthesizing a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by synthesizer circuitry 1206D. The amplifier circuitry 1206B may be configured to amplify the down-converted signals and the filter circuitry 1206C may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by filter circuitry 1206C.

In some embodiments, the mixer circuitry 1206A of the receive signal path and the mixer circuitry 1206A of the transmit signal path may include two or more mixers and may be arranged for quadrature downconversion and upconversion, respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A may be arranged for direct downconversion and direct upconversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206D may be a fractional-N synthesizer or a fractional N/N+1 synthesizer, although the scope of the embodiments is not limited in this respect as other types of frequency synthesizers may be suitable. For example, synthesizer circuitry 1206D may be a delta-sigma synthesizer, a frequency multiplier, or a synthesizer comprising a phase-locked loop with a frequency divider.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206D of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer. As referred to herein, Layer 2 may comprise a medium access control (MAC) layer, a radio link control (RLC) layer, and a packet data convergence protocol (PDCP) layer. As referred to herein, Layer 1 may comprise a physical (PHY) layer of a UE/RAN node.

In some embodiments, the 1200 of FIG. 12 may be configured to perform one or more processes, techniques, or methods as described herein, or portions thereof. For example, the device 1200 may perform operations described in FIGS. 9-10.

Figure 13:
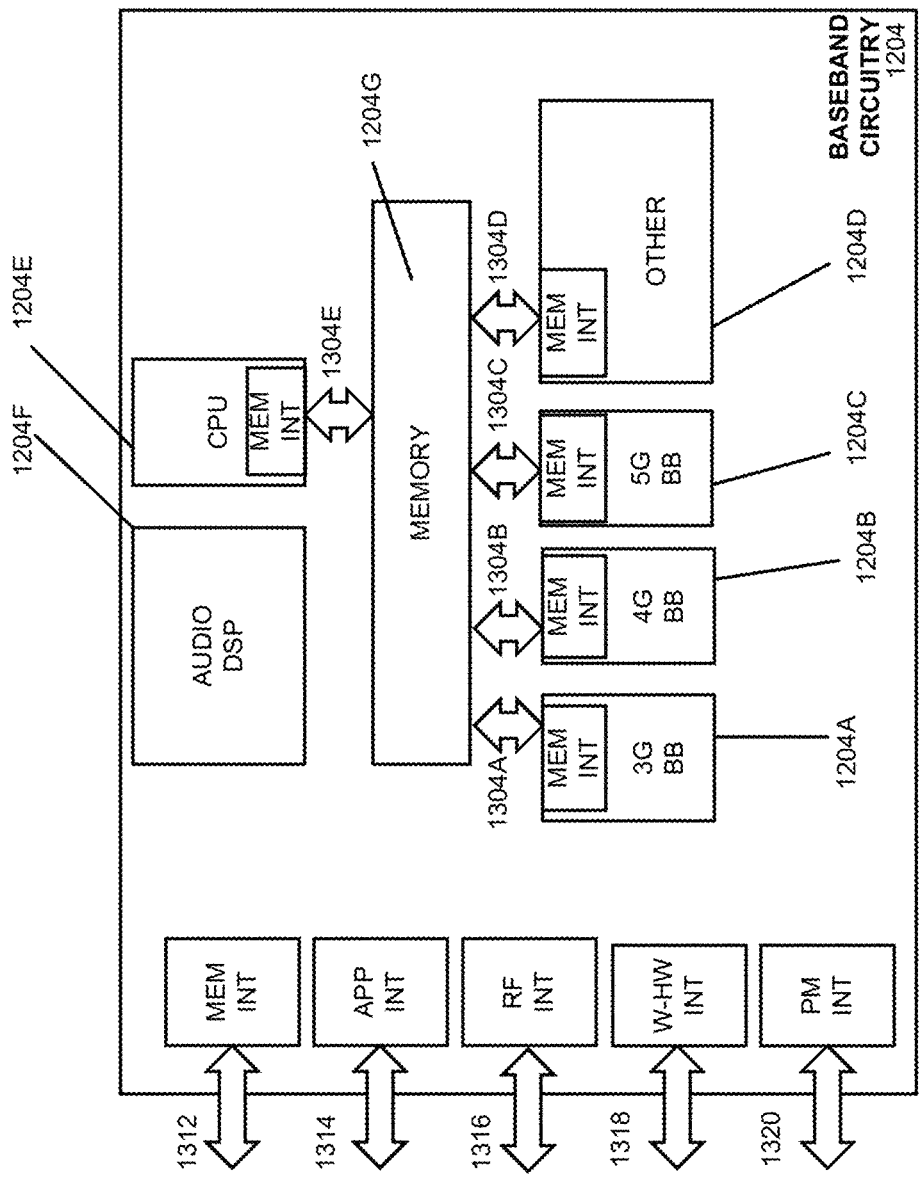
FIG. 13 illustrates example interfaces of baseband circuitry in accordance with various embodiments of the disclosure.

FIG. 13 illustrates example interfaces of baseband circuitry, in accordance with various embodiments of the disclosure. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212).

Figure 14:
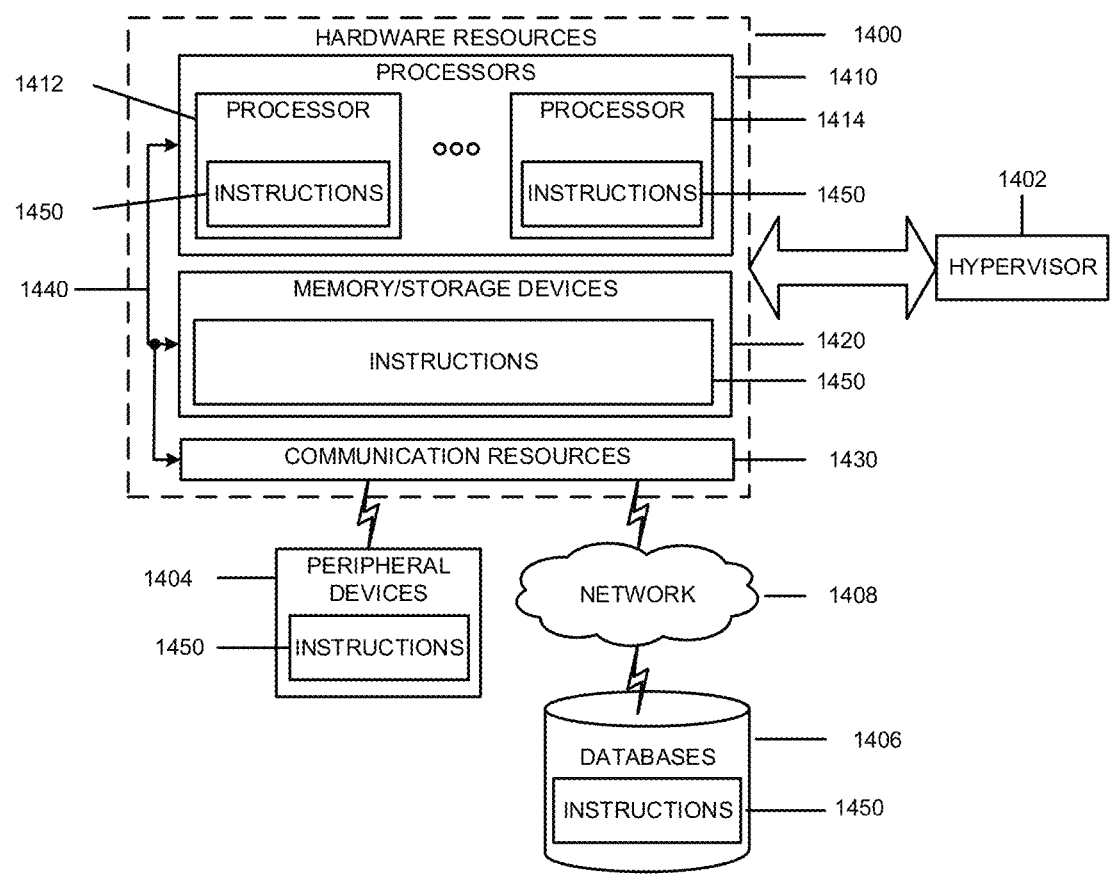
FIG. 14 illustrates hardware resources in accordance with various embodiments of the disclosure.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400.

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

In embodiments in which the hardware resources 1400 are incorporated into the UEs 120, the instructions 1450 may cause the processors 1410 to perform the method 900 as shown in the flow charts of FIG. 9.

In embodiments in which the hardware resources 1400 are incorporated into the base station 110, the instructions 1450 may cause the processors 1410 to perform the method 1000 as shown in the flow charts of FIG. 10.

The resources described in FIG. 14 may also be referred to as circuitry. For example, communication resources 1430 may also be referred to as communication circuitry 1430.

Some non-limiting examples are provided below. Each of the examples stands as an embodiment itself.

Example 1 includes an apparatus for a user equipment (UE), comprising: a memory interface, operable to receive a configuration of a frame from a memory, the frame is to be used for communications in a Narrow Band Internet of Things (NB-IoT) system in a sub-1 GHz band, wherein the frame includes one or more anchor channels and one or more data channels; and a processor, operable to encode uplink (UL) communication data for a base station or decode downlink (DL) communication data from the base station based on the configuration of the frame.

Example 2 includes the apparatus of example 1, wherein when the UE is in an idle mode, the processor is operable to initiate an initial access procedure or a resynchronize procedure on an anchor channel of the frame to synchronize or resynchronize with the base station.

Example 3 includes the apparatus of examples 1 or 2, wherein the one or more anchor channels are fixed channels or hard-coded physical channels.

Example 4 includes the apparatus of any of examples 1-3, wherein the anchors channels are used for broadcasting DL transmission, including at least one of more of a Primary Synchronization Signal (PSS), a Secondary Synchronization Signal (SSS), a Physical Broadcast Channel (PBCH).

Example 5 includes the apparatus of example 1, wherein each of the anchor channels and data channels is predefined as either hopped or fixed, and when a channel is predefined as hopped, a hopping pattern is generated based on one or more of: a cell identity (ID), a frame/subframe index, a high layer configured index, and a UE index.

Example 6 includes the apparatus of any of examples 1-5, wherein different channels have the same or different UL/DL configurations.

Example 7 includes the apparatus of any of examples 1-6, wherein random channel hopping patterns for different channels are selected to avoid a frequency point collision between different channels at a specific time instance.

Example 8 includes the apparatus of example 7, wherein when the frequency point collision occurs between two data channels, the processor is operable to decode a decision received from the base station, wherein the decision is made by the base station based on an implementation of the base station for scheduling on the collided frequency point, and the decision is to schedule different UEs on one channel or different channels.

Example 9 includes the apparatus of any of examples 1-8, wherein the processor is operable to decode a Discovery Reference Signal (DRS) received from the base station on an anchor channel, wherein the DRS includes one or more of a Primary Synchronization Signal (PSS), a Secondary Synchronization Signal (SSS), a Physical Broadcast Channel (PBCH), and a System Information Block (SIB).

Example 10 includes the apparatus of any of examples 1-9, wherein dwell time of an anchor channel is the same as or different from dwell time of a data channel.

Example 11 includes the apparatus of any of examples 1-10, wherein a frequency of an anchor channel is fixed, and wherein the frequency of the anchor channel corresponds to a logic channel index.

Example 12 includes the apparatus of any of examples 1-11, wherein a hopping pattern of either an anchor channel or a data channel is a pseudo random pattern.

Example 13 includes the apparatus of example 2, wherein the anchor channel for the initial access procedure or the resynchronization procedure is defined as $N_{data} \times T_{dwell}$, wherein $T_{dwell}$ is a time duration of an anchor channel, and $N_{data}$ is a number of data dwells of time duration $T_{dwell}$.

Example 14 includes the apparatus of any of examples 1-13, wherein each of the anchor channels and data channels is able to be used for transmission of one of more of: a Primary Synchronization Signal (PSS), a Secondary Synchronization Signal (SSS), a Physical Broadcast Channel (PBCH), an essential System Information Block (SIB), and broadcast or unicast downlink or uplink subframes.

Example 15 includes the apparatus of example 1, wherein the processor is operable to monitor a narrow band Physical Downlink Control Channel (nPDCCH), a narrow band Physical Downlink Share Channel (nPDSCH), and encode transmission of a narrow band Physical Uplink Share Channel (nPUSCH) on the same channel.

Example 16 includes the apparatus of any of examples 1-15, wherein a number of the anchor channels is predefined.

Example 17 includes the apparatus of any of examples 1-16, wherein dwell time of an anchor channel is 20 ms.

Example 18 includes the apparatus of any of examples 1-17, wherein an anchor channel is inserted after every 4 data channels.

Example 19 includes an apparatus for a base station, comprising a memory interface, operable to receive a configuration of a frame from a memory, the frame is to be used for communications in a Narrow Band Internet of Things (NB-IoT) system in a sub-1 GHz band, wherein the frame includes one or more anchor channels and one or more data channels; and a processor, operable to decode uplink (UL) communication data from a user equipment (UE) or encode downlink (DL) communication data for the UE based on the configuration of the frame.

Example 20 includes the apparatus of example 19, wherein the one or more anchor channels are fixed channels or hard-coded physical channels.

Example 21 includes the apparatus of examples 19 or 20, wherein the anchors channels are used for broadcasting DL transmission, including at least one of more of a Primary Synchronization Signal (PSS), a Secondary Synchronization Signal (SSS), a Physical Broadcast Channel (PBCH).

Example 22 includes the apparatus of any of examples 19-21, wherein each of the anchor channels and data channels is predefined as either hopped or fixed, and when a channel is predefined as hopped, a hopping pattern is generated based on one or more of: a cell identity (ID), a frame/subframe index, a high layer configured index, and a UE index.

Example 23 includes the apparatus of any of examples 19-22, wherein different channels have the same or different UL/DL configurations.

Example 24 includes the apparatus of any of examples 19-23, wherein random channel hopping patterns for different channels are selected to avoid a frequency point collision between different channels at a specific time instance.

Example 25 includes the apparatus of example 24, wherein when the frequency point collision occurs between two data channels, the processor is operable to make a decision based on an implementation of the base station for scheduling on the collided frequency point, and the decision is to schedule different UEs on one channel or different channels.

Example 26 includes the apparatus of any of examples 19-25, wherein the processor is operable to encode a Discovery Reference Signal (DRS) to be transmitted on an anchor channel, wherein the DRS includes one or more of: a Primary Synchronization Signal (PSS), a Secondary Synchronization Signal (SSS), a Physical Broadcast Channel (PBCH), and a System Information Block (SIB).

Example 27 includes the apparatus of any of examples 19-26, wherein a number of the anchors is pre-defined.

Example 28 includes the apparatus of any of examples 19-27, wherein each of the anchor channels and data channels is able to be used for transmission of one of more of: a Primary Synchronization Signal (PSS), a Secondary Synchronization Signal (SSS), a Physical Broadcast Channel (PBCH), an essential System Information Block (SIB), and broadcast or unicast downlink or uplink subframes.

Example 29 includes the apparatus of any of examples 19-28, wherein dwell time of an anchor channel is the same as or different from dwell time of a data channel.

Example 30 includes the apparatus of any of examples 19-29, wherein dwell time of an anchor channel is 20 ms.

Example 31 includes the apparatus of any of examples 19-30, wherein a frequency of an anchor channel is fixed, and wherein the frequency of the anchor channel corresponds to a logic channel index Example 32 includes the apparatus of any of examples 19-31, wherein a hopping pattern of either an anchor channel or a data channel is a pseudo random pattern.

Example 33 includes the apparatus of example 19, wherein the anchor channel for the initial access procedure or the resynchronization procedure is defined as $N_{data} \times T_{dwell}$, wherein $T_{dwell}$ is a time duration of an anchor channel, and $N_{data}$ is a number of data dwells of time duration $T_{dwell}$.

Example 34 includes the apparatus of any of examples 19-33, wherein the processor is operable to encode a Discovery Reference Signal (DRS) and broadcasting information for transmission on an anchor channel.

Example 35 includes the apparatus of any of examples 19-34, wherein an anchor channel is inserted after every 4 data channels.

Example 36 includes a method performed by a user equipment (UE). The method includes initiating an initial access procedure or a resynchronization procedure on an anchor channel of a frame for communications in a Narrow Band Internet of Things (NB-IoT) system in a sub-1 GHz band, to synchronize or resynchronize with a base station, when the UE is in an idle mode, wherein the frame includes one or more anchor channels and one or more data channels; and decoding downlink (DL) transmission received from the base station on the anchor channel, wherein the DL transmission includes at least one of more of a Primary Synchronization Signal (PSS), a Secondary Synchronization Signal (SSS) and a Physical Broadcast Channel (PBCH).

Example 37 includes the method of example 36, wherein the one or more anchor channels are fixed channels or hard-coded physical channels.

Example 38 includes the method of example 36, wherein each of the anchor channels and data channels is predefined as either hopped or fixed, and when a channel is predefined as hopped, a hopping pattern is generated based on one or more of: a cell identity (ID), a frame/subframe index, a high layer configured index, and a UE index.

Example 39 includes the method of any of examples 36-38, wherein different channels have the same or different uplink (UL)/DL configurations.

Example 40 includes the method of any of examples 36-40, wherein random channel hopping patterns for different channels are selected to avoid a frequency point collision between different channels at a specific time instance.

Example 41 includes the method of example 40, wherein when the frequency point collision occurs between two data channels, the method further comprises decoding a decision received from the base station, wherein the decision is made by the base station based on an implementation of the base station for scheduling on the collided frequency point, and the decision is to schedule different UEs on one channel or different channels.

Example 42 includes the method of any of examples 36-41, further comprising decoding a Discovery Reference Signal (DRS) received from the base station on an anchor channel, wherein the DRS includes one or more of a Primary Synchronization Signal (PSS), a Secondary Synchronization Signal (SSS), a Physical Broadcast Channel (PBCH), and a System Information Block (SIB).

Example 43 includes the method of any of examples 36-42, wherein a frequency of an anchor channel is fixed, and wherein the frequency of the anchor channel corresponds to a logic channel index.

Example 44 includes the method of any of examples 36-43, wherein a hopping pattern of either an anchor channel or a data channel is a pseudo random pattern.

Example 45 includes the method of any of examples 36-44, wherein the anchor channel for the initial access procedure or the resynchronization procedure is defined as $N_{data} \times T_{dwell}$, wherein $T_{dwell}$ is a time duration of an anchor channel, and $N_{data}$ is a number of data dwells of time duration $T_{dwell}$.

Example 46 includes the method of any of examples 36-45, wherein each of the anchor channels and data channels is able to be used for transmission of one of more of: a Primary Synchronization Signal (PSS), a Secondary Synchronization Signal (SSS), a Physical Broadcast Channel (PBCH), an essential System Information Block (SIB), and broadcast or unicast downlink or uplink subframes.

Example 47 includes the method of any of examples 36-46, further comprising monitoring a narrow band Physical Downlink Control Channel (nPDCCH), a narrow band Physical Downlink Share Channel (nPDSCH), and encoding transmission of a narrow band Physical Uplink Share Channel (nPUSCH) on the same channel.

Example 48 includes the method of any of examples 36-47, wherein a number of the anchor channels is pre-defined.

Example 49 includes the method of any of examples 36-48, wherein dwell time of an anchor channel is the same as or different from dwell time of a data channel, and wherein the dwell time of the anchor channel is 20 ms.

Example 50 includes the method of any of examples 36-49, wherein an anchor channel is inserted after every 4 data channels.

Example 51 includes a method performed by a base station. The method includes decoding a request received on an anchor channel of a frame for communications in a Narrow Band Internet of Things (NB-IoT) system in a sub-1 GHz band, from a user equipment (UE), for an initial access procedure or a resynchronization procedure, wherein the frame includes one or more anchor channels and one or more data channels; and encoding downlink (DL) transmission to the UE on the anchor channel, wherein the DL transmission includes at least one of more of a Primary Synchronization Signal (PSS), a Secondary Synchronization Signal (SSS) and a Physical Broadcast Channel (PBCH).

Example 52 includes the method of example 51, wherein the one or more anchor channels are fixed channels or hard-coded physical channels.

Example 53 includes the method of example 51, wherein each of the anchor channels and data channels is predefined as either hopped or fixed, and when a channel is predefined as hopped, a hopping pattern is generated based on one or more of: a cell identity (ID), a frame/subframe index, a high layer configured index, and a UE index.

Example 54 includes the method of any of examples 51-53, wherein different channels have the same or different uplink (UL)/DL configurations.

Example 55 includes the method of any of examples 51-54, wherein random channel hopping patterns for different channels are selected to avoid a frequency point collision between different channels at a specific time instance.

Example 56 includes the method of example 55, wherein when the frequency point collision occurs between two data channels, the method further comprises making a decision based on an implementation of the base station for scheduling on the collided frequency point, and the decision is to schedule different UEs on one channel or different channels.

Example 57 includes the method of any of examples 51-56, further comprising encoding a Discovery Reference Signal (DRS) for transmission to the UE on an anchor channel, wherein the DRS includes one or more of: a Primary Synchronization Signal (PSS), a Secondary Synchronization Signal (SSS), a Physical Broadcast Channel (PBCH), and a System Information Block (SIB).

Example 58 includes the method of any of examples 51-57, wherein a number of the anchors is pre-defined.

Example 59 includes the method of any of examples 51-58, wherein each of the anchor channels and data channels is able to be used for transmission of one of more of: a Primary Synchronization Signal (PSS), a Secondary Synchronization Signal (SSS), a Physical Broadcast Channel (PBCH), an essential System Information Block (SIB), and broadcast or unicast downlink or uplink subframes.

Example 60 includes the method of any of examples 51-59, wherein dwell time of an anchor channel is the same as or different from dwell time of a data channel.

Example 61 includes the method of any of examples 51-60, wherein dwell time of an anchor channel is 20 ms.

Example 62 includes the method of any of examples 51-61, wherein a frequency of an anchor channel is fixed, and wherein the frequency of the anchor channel corresponds to a logic channel index.

Example 63 includes the method of any of examples 51-62, wherein a hopping pattern of either an anchor channel or a data channel is a pseudo random pattern.

Example 64 includes the method of example 63, wherein the anchor channel for the initial access procedure or the resynchronization procedure is defined as $N_{data} \times T_{dwell}$, wherein $T_{dwell}$ is a time duration of an anchor channel, and $N_{data}$ is a number of data dwells of time duration $T_{dwell}$.

Example 65 includes the method of any of examples 51-64, further comprising encoding a Discovery Reference Signal (DRS) and broadcasting information for transmission on an anchor channel.

Example 66 includes the method of any of examples 51-65, wherein an anchor channel is inserted after every 4 data channels.

Example 67 includes one or more computer-readable storage media having instructions stored thereon, which when executed by one or more processors of a user equipment (UE), cause the UE to perform a method according to any of examples 36-50.

Example 68 includes an apparatus for a user equipment (UE), comprising means for performing a method according to any of examples 36-50.

Example 69 includes one or more computer-readable storage media having instructions stored thereon, which when executed by one or more processors of a base station, cause the base station to perform a method according to any of examples 51-66.

Example 70 includes an apparatus for in a base station, comprising means for performing a method according to any of examples 51-66.

Example 71 includes a communication system in a Narrow Band Internet of Things (NB-IoT) system in a sub-1 GHz band, comprising a user equipment (UE) which includes an apparatus according to any of examples 1-18 and a base station which includes an apparatus according to any of examples 19-35.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus, comprising
a processor configured to cause a user equipment (UE) to:
receive a configuration of a frame from a memory, wherein the frame is to be used for communications in a Narrow Band Internet of Things (NB-IoT) system in an unlicensed sub-1 GHz band, wherein the frame includes an anchor channel and a plurality of data channels, wherein synchronization channels and a physical broadcast channel (PBCH) are received on the anchor channel, wherein traffic data is received according to a hopping pattern on the plurality of data channels, and wherein random channel hopping patterns for different channels are selected to avoid a frequency point collision between different channels at a specific time instance;
encode uplink (UL) communication data for a base station or decode downlink (DL) communication data from the base station based on the configuration of the frame; and
when the UE is in an idle mode, initiate an initial access procedure or a resynchronize procedure on the anchor channel of the frame to synchronize or resynchronize with the base station, wherein the anchor channel for the initial access procedure or the resynchronization procedure is defined as $N_{data} \times T_{dwell}$, wherein $T_{dwell}$ is a time duration of the anchor channel, and $N_{data}$ is a number of data dwells of time duration $T_{dwell}$.

2. The apparatus of claim 1, wherein the anchor channel is a fixed channel or a hard-coded physical channel.

3. The apparatus of claim 1, wherein the anchor channel is used for broadcasting DL transmissions, including at least one or more of a Primary Synchronization Signal (PSS), a Secondary Synchronization Signal (SSS), a Physical Broadcast Channel (PBCH).

4. The apparatus of claim 1, wherein each of the anchor channel and data channels is predefined as either hopped or fixed, and when a channel is predefined as hopped, the hopping pattern is generated based on one or more of: a cell identity (ID), a frame/subframe index, a high layer configured index, and a UE index.

5. The apparatus of claim 1, wherein different channels have the same or different UL/DL configurations.

6. The apparatus of claim 1, wherein when the frequency point collision occurs between two data channels, the processor is operable to:
decode a decision received from the base station, wherein the decision is made by the base station based on an implementation of the base station for scheduling on the collided frequency point, and the decision is to schedule different UEs on one channel or different channels.

7. The apparatus of claim 1, wherein the processor is operable to:
decode a Discovery Reference Signal (DRS) received from the base station on the anchor channel, wherein the DRS includes one or more of a Primary Synchronization Signal (PSS), a Secondary Synchronization Signal (SSS), a Physical Broadcast Channel (PBCH), and a System Information Block (SIB).

8. The apparatus of claim 1, wherein a frequency of the anchor channel is fixed, and wherein the frequency of the anchor channel corresponds to a logic channel index.

9. The apparatus of claim 1, wherein the hopping pattern is a pseudo random pattern.

10. The apparatus of claim 1, wherein each of the anchor channel and data channels is able to be used for transmission of one or more of: a Primary Synchronization Signal (PSS), a Secondary Synchronization Signal (SSS), a Physical Broadcast Channel (PBCH), an essential System Information Block (SIB), and broadcast or unicast downlink or uplink subframes.

11. An apparatus, comprising:
a processor configured to cause a base station to: receive a configuration of a frame from a memory, wherein the frame is to be used for communications in a Narrow Band Internet of Things (NB-IoT) system in an unlicensed sub-1 GHz band, wherein the frame includes an anchor channel and a plurality of data channels, wherein synchronization channels and a physical broadcast channel (PBCH) are transmitted on the anchor channel and traffic data is transmitted according to a hopping pattern on the plurality of data channels, and wherein random channel hopping patterns for different channels are selected to avoid a frequency point collision between different channels at a specific time instance;
decode uplink (UL) communication data from a user equipment (UE) or encode downlink (DL) communication data for the UE based on the configuration of the frame; and
when the UE is in an idle mode, perform an initial access procedure or a resynchronize procedure on the anchor channel of the frame to synchronize or resynchronize with the UE, wherein the anchor channel for the initial access procedure or the resynchronization procedure is defined as $N_{data} \times T_{dwell}$, wherein $T_{dwell}$ is a time duration of the anchor channel, and $N_{data}$ is a number of data dwells of time duration $T_{dwell}$.

12. The apparatus of claim 11, wherein the anchor channel is a fixed channel or a hard coded physical channel.

13. The apparatus of claim 11, wherein the anchor channel is used for broadcasting DL transmission, including at least one or more of a Primary Synchronization Signal (PSS), a Secondary Synchronization Signal (SSS), a Physical Broadcast Channel (PBCH).

14. The apparatus of claim 11, wherein each of the anchor channel and data channels is predefined as either hopped or fixed, and when a channel is predefined as hopped, the hopping pattern is generated based on one or more of: a cell identity (ID), a frame/subframe index, a high layer configured index, and a UE index.

15. The apparatus of claim 11, wherein different channels have the same or different UL/DL configurations.

16. The apparatus of claim 11, wherein when the frequency point collision occurs between two data channels, the processor is operable to:
  make a decision based on an implementation of the base station for scheduling on the collided frequency point, and the decision is to schedule different UEs on one channel or different channels.

17. The apparatus of claim 11, wherein the processor is operable to:
  encode a Discovery Reference Signal (DRS) to be transmitted on the anchor channel, wherein the DRS includes one or more of: a Primary Synchronization Signal (PSS), a Secondary Synchronization Signal (SSS), a Physical Broadcast Channel (PBCH), and a System Information Block (SIB).

18. The apparatus of claim 11, wherein a number of the anchors is predefined.

19. The apparatus of claim 11, wherein each of the anchor channel and data channels is able to be used for transmission of one of more of: a Primary Synchronization Signal (PSS), a Secondary Synchronization Signal (SSS), a Physical Broadcast Channel (PBCH), an essential System Information Block (SIB), and broadcast or unicast downlink or uplink subframes.

20. One or more non-transitory computer-readable media having instructions stored thereon, the instructions when executed by one or more processors of a user equipment (UE), cause the UE to:

initiate an initial access procedure or a resynchronization procedure on an anchor channel of a frame for communications in a Narrow Band Internet of Things (NB-IoT) system in an unlicensed sub-1 GHz band, to synchronize or resynchronize with a base station, when the UE is in an idle mode, wherein the frame includes an anchor channel and a plurality of data channels, wherein synchronization channels and a physical broadcast channel (PBCH) are received on the anchor channel and traffic data is received according to a hopping pattern on the plurality of data channels, wherein random channel hopping patterns for different channels are selected to avoid a frequency point collision between different channels at a specific time instance, and wherein the anchor channel for the initial access procedure or the resynchronization procedure is defined as $N_{data} \times T_{dwell}$, wherein $T_{dwell}$ is a time duration of the anchor channel, and $N_{data}$ is a number of data dwells of time duration $T_{dwell}$; and decode downlink (DL) transmission received from the base station on the anchor channel, wherein the DL transmission includes at least one of more of a Primary Synchronization Signal (PSS), a Secondary Synchronization Signal (SSS) and a Physical Broadcast Channel (PBCH).

* * * * *